US012645397B2

(12) United States Patent
Helmick et al.

(10) Patent No.: US 12,645,397 B2
(45) Date of Patent: Jun. 2, 2026

(54) SOLVING SUBMISSION QUEUE ENTRY OVERFLOW WITH SHADOW SUBMISSION QUEUE

(71) Applicant: Samsung Electronics Co., Ltd., Suwon-si (KR)

(72) Inventors: Daniel Lee Helmick, Thornton, CO (US); Robert Wayne Moss, Fort Collins, CO (US); Michael Allison, Longmont, CO (US); Sumanth Jannyavula Venkata, Pleasanton, CA (US); Judith Rose Brock, Berkeley, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/227,899

(22) Filed: Jul. 28, 2023

(65) Prior Publication Data

US 2024/0168681 A1 May 23, 2024

Related U.S. Application Data

(60) Provisional application No. 63/427,410, filed on Nov. 22, 2022, provisional application No. 63/427,415, filed on Nov. 22, 2022.

(51) Int. Cl.
*G06F 3/06* (2006.01)
(52) U.S. Cl.
CPC .......... *G06F 3/0659* (2013.01); *G06F 3/0679* (2013.01); *G06F 3/0604* (2013.01)
(58) Field of Classification Search
CPC ..... G06F 3/0604; G06F 3/0659; G06F 3/0679

USPC .......................................................... 711/154
See application file for complete search history.

(56) References Cited

U.S. PATENT DOCUMENTS

| | | | | |
|---|---|---|---|---|
| 8,554,968 B1 * | 10/2013 | Onufryk | ................. | G06F 13/24 |
| | | | | 710/48 |
| 8,677,068 B2 | 3/2014 | Canepa et al. | | |
| 9,110,786 B2 | 8/2015 | Carlson et al. | | |
| 9,304,690 B2 | 4/2016 | McCambridge et al. | | |
| 9,760,281 B2 | 9/2017 | Ramalingam | | |

(Continued)

FOREIGN PATENT DOCUMENTS

| | | |
|---|---|---|
| CN | 109542335 A | 3/2019 |
| CN | 112214435 A | 1/2021 |

(Continued)

OTHER PUBLICATIONS

NVM Express Base Specification Revision 1.4, Jun. 10, 2019 (Year: 2019).*

(Continued)

*Primary Examiner* — Reginald G Bragdon
*Assistant Examiner* — Aaron D Ho
(74) *Attorney, Agent, or Firm* — Renaissance IP Law Group LLP

(57) ABSTRACT

A memory is disclosed. The memory may include a first data structure. The first data structure may include a first field to store a first data relating to a command. The memory may also include a second data structure. The second data structure may include a second field to store a second data relating to the command. A first queue stored in the memory may include the first data structure. A second queue stored in the memory may include the second data structure.

15 Claims, 21 Drawing Sheets

(56) References Cited

U.S. PATENT DOCUMENTS

| | | | |
|---|---|---|---|
| 10,387,078 B1 | 8/2019 | Benisty | |
| 10,466,903 B2 | 11/2019 | Benisty et al. | |
| 10,732,897 B2 | 8/2020 | Benisty | |
| 10,742,737 B2 | 8/2020 | Choi et al. | |
| 10,880,204 B1 | 12/2020 | Shalev et al. | |
| 10,884,658 B2 | 1/2021 | Benisty | |
| 10,891,061 B2 | 1/2021 | Iwai et al. | |
| 11,036,628 B2 | 6/2021 | Hashimoto | |
| 11,169,938 B2 | 11/2021 | Gissin et al. | |
| 11,294,827 B2 | 4/2022 | Bennett et al. | |
| 11,301,163 B2 | 4/2022 | Zhang et al. | |
| 11,301,370 B2 | 4/2022 | Pasquale et al. | |
| 11,409,469 B2 | 8/2022 | Jo et al. | |
| 11,461,052 B1 | 10/2022 | Benisty | |
| 11,461,238 B2 | 10/2022 | Jang | |
| 11,467,769 B2 | 10/2022 | Benisty | |
| 11,570,257 B1 | 1/2023 | Tanach et al. | |
| 11,714,767 B1 | 8/2023 | Goldstein et al. | |
| 2007/0276789 A1 | 11/2007 | Keithley et al. | |
| 2011/0060875 A1 | 3/2011 | Haukness et al. | |
| 2012/0102275 A1 | 4/2012 | Resnick | |
| 2015/0223691 A1 | 8/2015 | Choi et al. | |
| 2015/0248366 A1* | 9/2015 | Bergsten | G06F 13/4221 |
| | | | 710/308 |
| 2016/0027481 A1 | 1/2016 | Hong | |
| 2017/0060422 A1 | 3/2017 | Sharifie et al. | |
| 2017/0097908 A1 | 4/2017 | Simionescu et al. | |
| 2017/0116117 A1 | 4/2017 | Rozen et al. | |
| 2017/0123721 A1* | 5/2017 | Sela | G06F 3/0611 |
| 2017/0123991 A1* | 5/2017 | Sela | G06F 12/0246 |
| 2017/0322897 A1 | 11/2017 | Benisty et al. | |
| 2018/0113615 A1 | 4/2018 | Park | |
| 2018/0335963 A1* | 11/2018 | Simionescu | G06F 11/1662 |
| 2019/0035445 A1 | 1/2019 | Huang | |
| 2019/0042146 A1 | 2/2019 | Wysoczanski et al. | |
| 2019/0243571 A1* | 8/2019 | Narayanan | G06F 3/0673 |
| 2019/0278523 A1 | 9/2019 | Benisty | |
| 2019/0294366 A1 | 9/2019 | Kawamura et al. | |
| 2020/0004445 A1* | 1/2020 | Benisty | G06F 3/0664 |
| 2020/0151134 A1 | 5/2020 | Helmick et al. | |
| 2020/0174819 A1* | 6/2020 | Dong | G06F 13/1668 |
| 2020/0409601 A1 | 12/2020 | Helmick et al. | |
| 2021/0026780 A1 | 1/2021 | Ahmed et al. | |
| 2021/0103445 A1 | 4/2021 | Schauer et al. | |
| 2021/0182219 A1* | 6/2021 | Benisty | G06F 3/0604 |
| 2021/0208810 A1 | 7/2021 | Manohar | |
| 2021/0247935 A1 | 8/2021 | Beygi et al. | |
| 2022/0027292 A1 | 1/2022 | Gissin et al. | |
| 2022/0035530 A1 | 2/2022 | Vikram Singh | |
| 2022/0035564 A1 | 2/2022 | Vikram Singh et al. | |
| 2022/0043570 A1 | 2/2022 | Richter et al. | |
| 2022/0083269 A1 | 3/2022 | Sano et al. | |
| 2022/0147276 A1* | 5/2022 | Watanabe | G06F 3/0604 |
| 2022/0156001 A1 | 5/2022 | Anandan et al. | |
| 2022/0171572 A1 | 6/2022 | Gyllenskog | |
| 2022/0197704 A1 | 6/2022 | Gibb et al. | |
| 2022/0261183 A1 | 8/2022 | Horspool et al. | |
| 2022/0311716 A1 | 9/2022 | Dutta | |
| 2022/0357887 A1 | 11/2022 | Wu et al. | |
| 2023/0004329 A1 | 1/2023 | Benisty | |
| 2023/0079432 A1 | 3/2023 | Kawaguchi | |
| 2023/0297246 A1 | 9/2023 | Nagai et al. | |
| 2023/0333775 A1 | 10/2023 | Jain et al. | |
| 2023/0376422 A1 | 11/2023 | Watanabe | |
| 2024/0354021 A1 | 10/2024 | Xu et al. | |

FOREIGN PATENT DOCUMENTS

| | | | |
|---|---|---|---|
| DE | 102020108303 A1 | 12/2020 | |
| EP | 3945407 A1 | 2/2022 | |
| WO | 2022143774 A1 | 7/2022 | |

OTHER PUBLICATIONS

Bhimani, Janki et al., "Fine-Grained Control of Concurrency Within KV-SSDs," Proceedings of the 14th ACM International Conference on Systems and Storage, Jun. 2021, 12 pages.

Borello, Gabriele, "Towards Computational Storage," Master's Degree Thesis, Politecnico Di Torino, Oct. 2021, 101 pages.

Marks, Kevin, "An NVM Express Tutorial," Flash Memory Summit, 2013, 92 pages.

Office Action for U.S. Appl. No. 18/227,897, mailed Sep. 16, 2024.

Office Action for U.S. Appl. No. 18/227,902, mailed Sep. 6, 2024.

Final Office Action for U.S. Appl. No. 18/227,897, mailed Feb. 20, 2025.

Final Office Action for U.S. Appl. No. 18/227,902, mailed Apr. 18, 2025.

Notice of Allowance for U.S. Appl. No. 18/227,902, mailed Aug. 4, 2025.

Office Action for U.S. Appl. No. 18/227,897, mailed Oct. 28, 2025.

Corrected Notice of Allowability for U.S. Appl. No. 18/227,902, mailed Nov. 19, 2025.

Notice of Allowance for U.S. Appl. No. 18/227,897, mailed Apr. 17, 2026.

* cited by examiner

710

815    820    825    830

805

| Phase Bit | Size | Version | Format |
|---|---|---|---|

| Field 1 | Field 2 | Field 3 |
|---|---|---|
| 835-1 | 835-2 | 835-3 |

Data

810

105

905

Request

120

Storage
Device

910

Log Page

Host

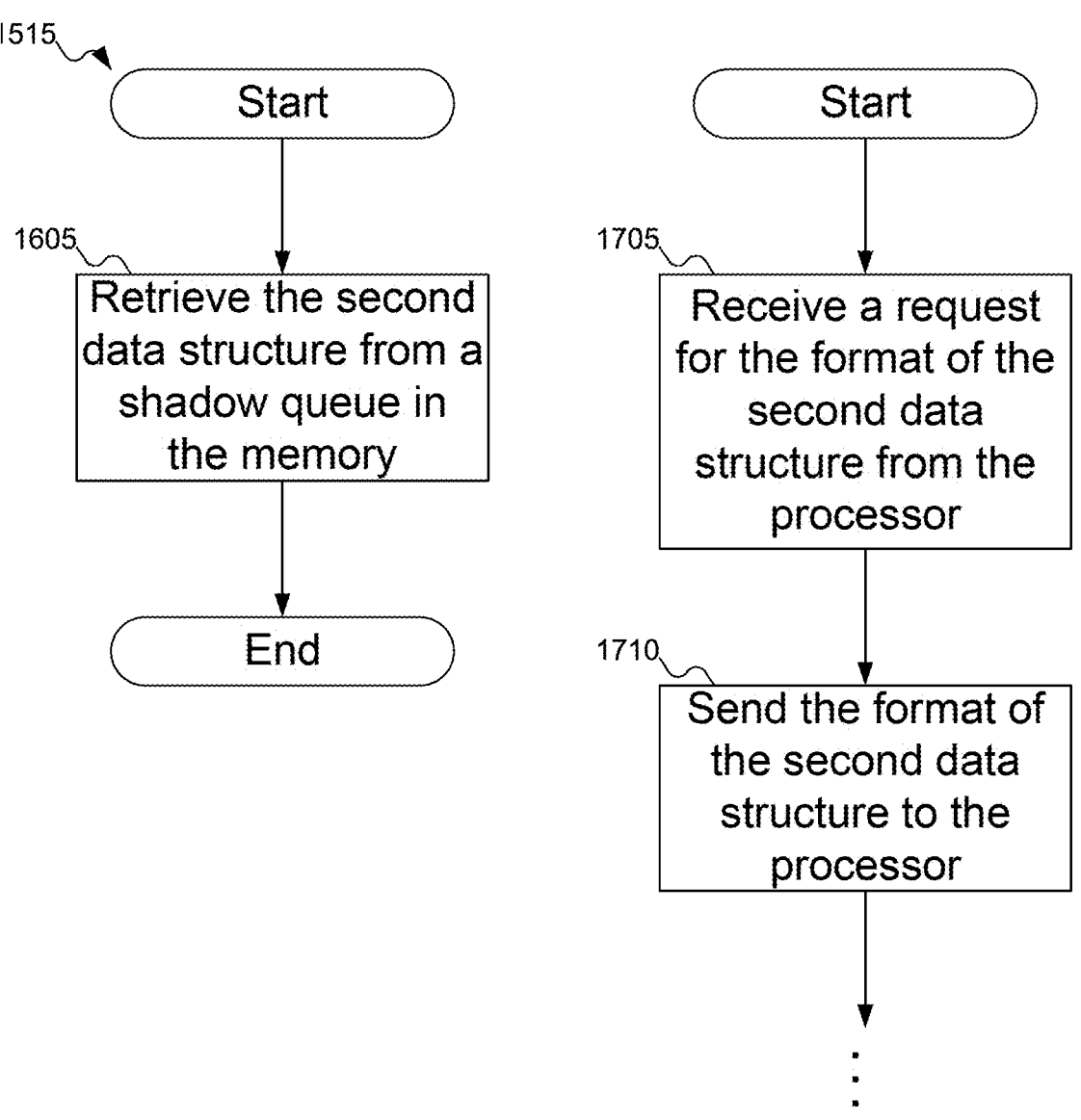
FIG. 16                    FIG. 17

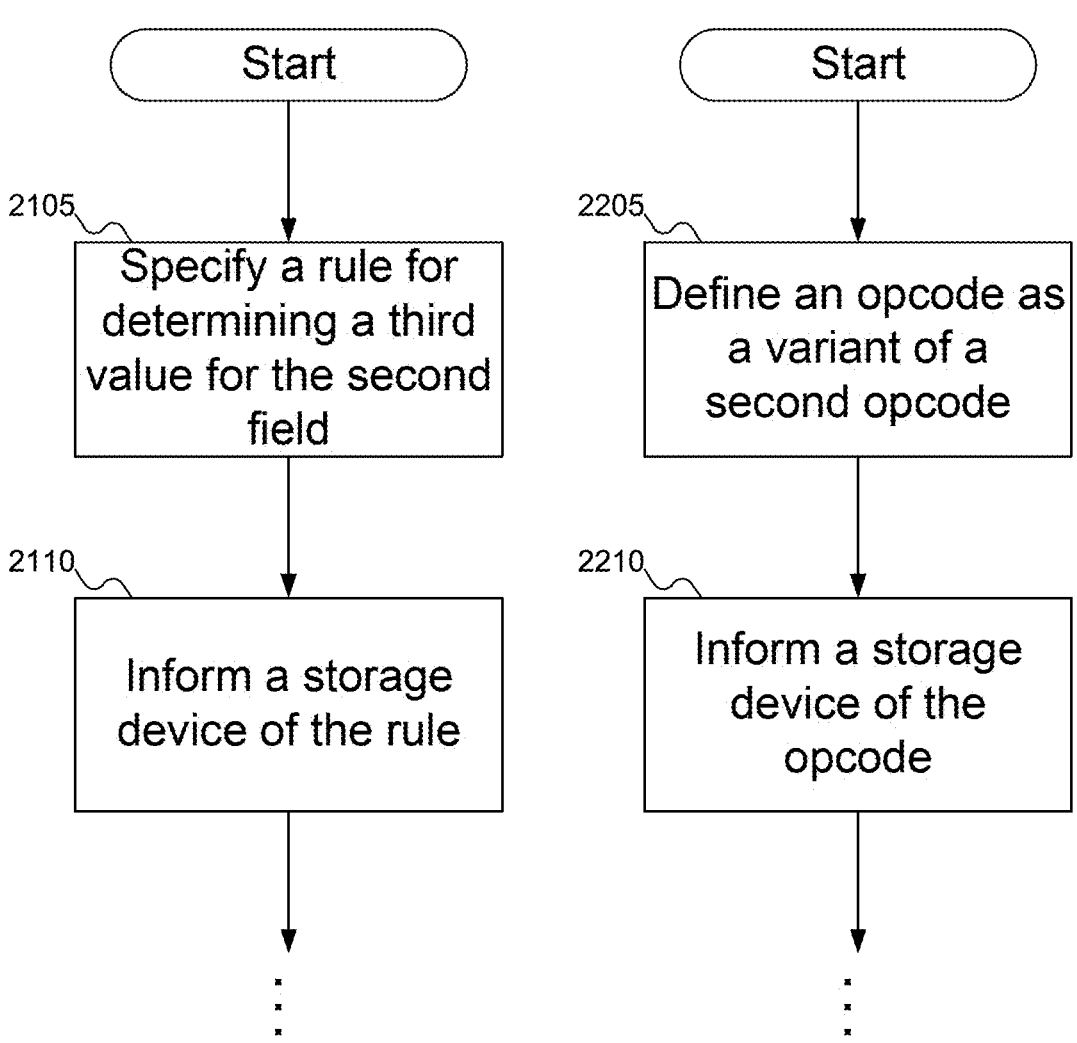
FIG. 21          FIG. 22

Start

2305
Receive a notice at a storage device from a processor that a data structure is stored in a submission queue in a memory, the data structure including a first field storing a first value and a second field storing a first value 2310
Retrieve the data structure from the submission queue by the storage device 2315
Determine a third value for the second field End

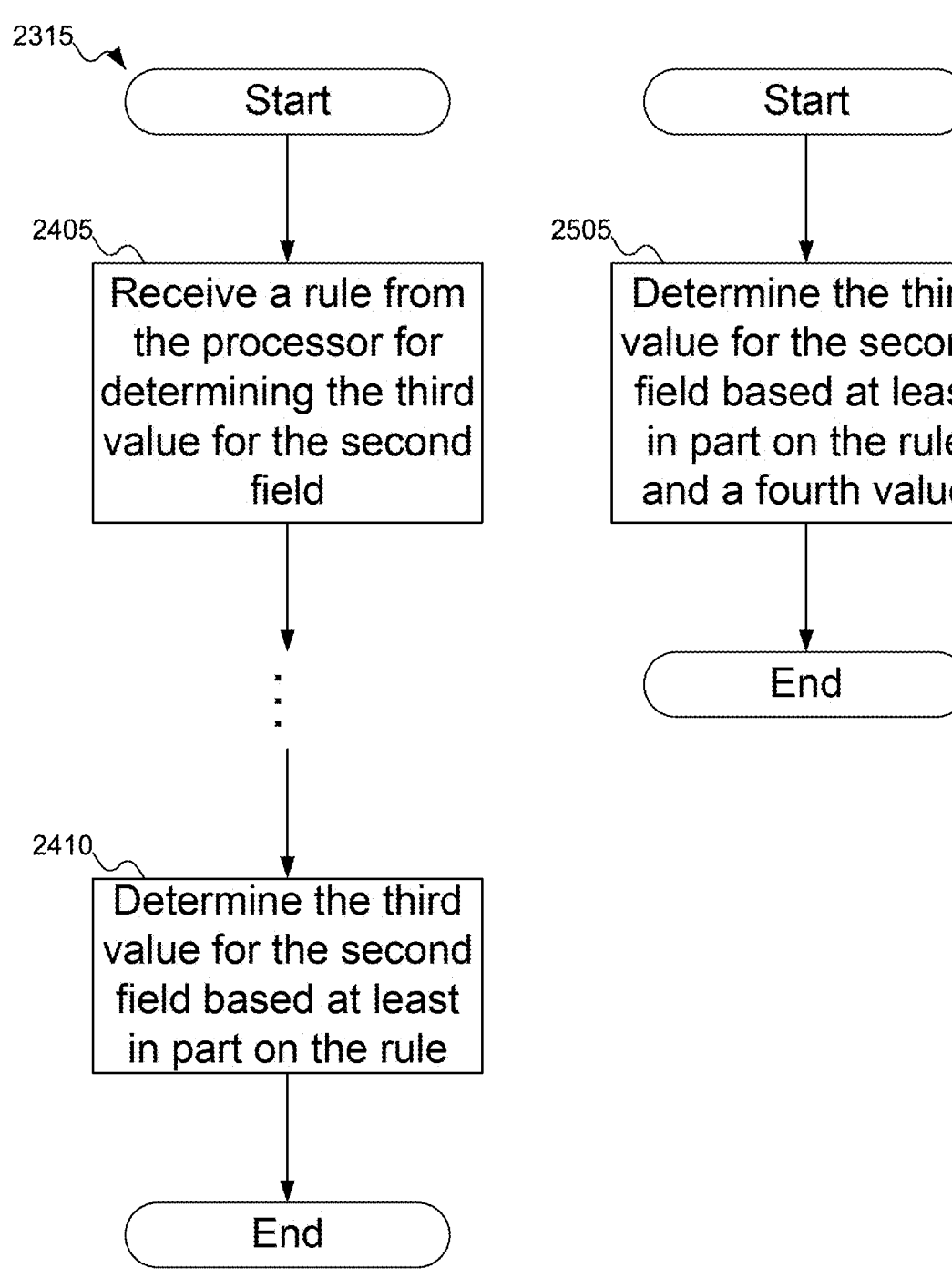
FIG. 24                 FIG. 25

SOLVING SUBMISSION QUEUE ENTRY OVERFLOW WITH SHADOW SUBMISSION QUEUE

RELATED APPLICATION DATA

This application claims the benefit of U.S. Patent Application Ser. No. 63/427,415, filed Nov. 22, 2022, and U.S. Provisional Patent Application Ser. No. 63/427,410, filed Nov. 22, 2022, both of which are incorporated by reference herein for all purposes.

This application is related to U.S. patent application Ser. No. 18/227,897, filed Jul. 28, 2023, which claims the benefit of U.S. Provisional Patent Application Ser. No. 63/427,407, filed Nov. 22, 2022, both of which are incorporated by reference for all purposes.

This application is related to U.S. patent application Ser. No. 18/227,902, filed Jul. 28, 2023, which claims the benefit of U.S. Provisional Patent Application Ser. No. 63/453,754, filed Mar. 21, 2023, U.S. Provisional Patent Application Ser. No. 63/427,422, filed Nov. 22, 2022, and U.S. Provisional Patent Application Ser. No. 63/427,420, filed Nov. 22, 2022, all of which are incorporated by reference herein for all purposes.

FIELD

The disclosure relates generally to storage devices, and more particularly to increasing the amount of data that may be included with a submission queue entry.

BACKGROUND

Hosts submit commands to storage devices using submission queues. A typical submission queue entry includes 64 bytes of data. Fields in the submission queue entries include, for example, an identifier for the command and the logical block address of the data, among other possibilities. But as the amount of data included in a submission queue entry, particularly information that is included in a standard, has grown, the space available for additional information that might be provided by the host has shrunk. Soon, almost every bit in a submission queue entry may be used, leaving no room for additional data that a host might want to include in a submission queue entry.

A need remains to support including additional data in a submission queue entry.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 16 shows a flowchart of an example procedure for the storage of FIG. 1 to retrieve the shadow queue entry of FIGS. 7A-7B from the shadow queues of FIGS. 7A-7B, according to embodiments of the disclosure.

FIG. 17 shows a flowchart of an example procedure for the storage device of FIG. 1 to receive a request for and return information about the structure of the shadow queue entry of FIGS. 7A-7B expected by the storage device of FIG. 1, according to embodiments of the disclosure.

FIG. 21 shows a flowchart of an example procedure for the processor of FIG. 1 to provide the rule of FIG. 19 to the storage device of FIG. 1 regarding how to assign value(s) to field(s) in the submission queue entry of FIG. 4, according to embodiments of the disclosure.

FIG. 22 shows a flowchart for the processor of FIG. 1 to define a variant opcode to indicate when the rule of FIG. 19 should be used by the storage device of FIG. 1, according to embodiments of the disclosure.

FIG. 24 shows a flowchart of an example procedure for the storage device of FIG. 1 to apply the rule of FIG. 19 to field(s) in the submission queue entry of FIG. 4, according to embodiments of the disclosure.

FIG. 25 shows a flowchart of an example procedure for the storage device of FIG. 1 to apply the rule of FIG. 19 to field(s) in the submission queue entry of FIG. 4 using another field in the submission queue entry of FIG. 4, according to embodiments of the disclosure.

SUMMARY

Figure 1:
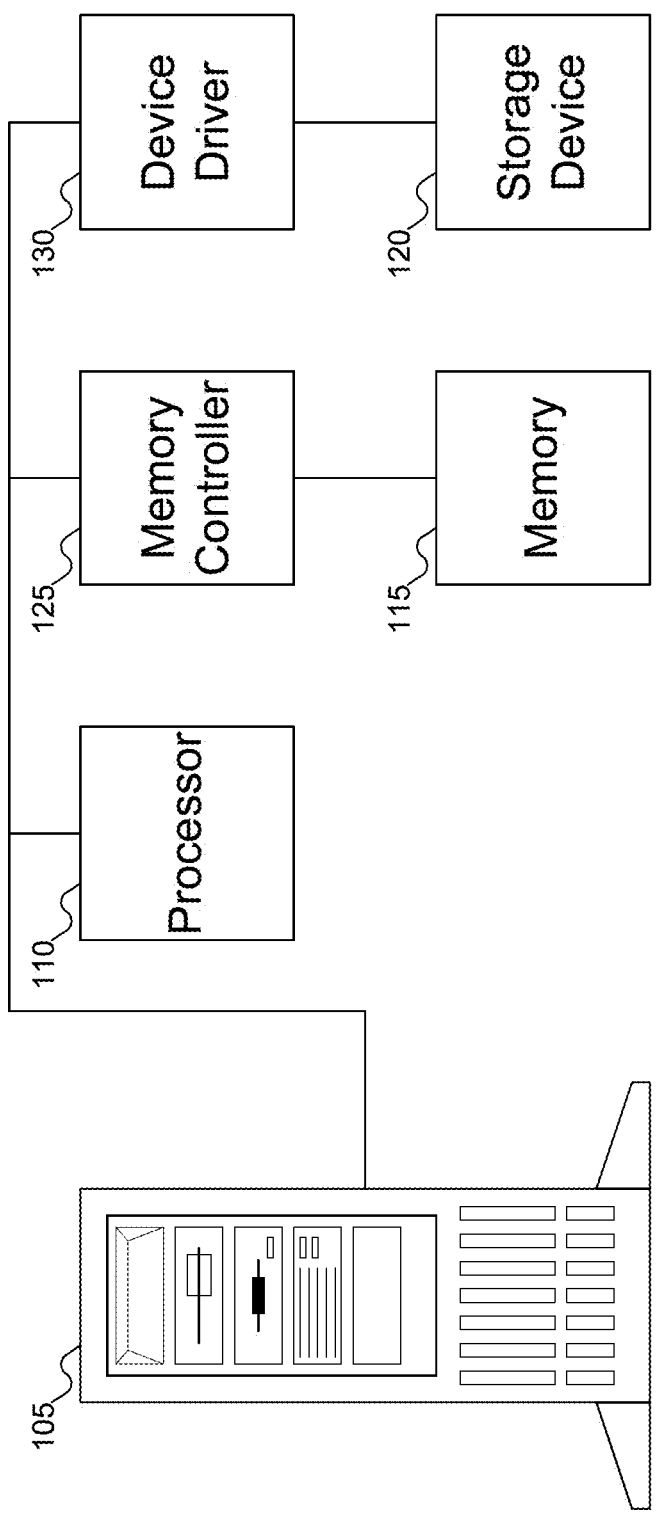
FIG. 1 shows a machine including a processor and storage device to support submission queue entries for commands sent to the storage device, according to embodiments of the disclosure.

Embodiments of the disclosure include a processor. The processor may establish data structures for a submission queue entry and a shadow queue entry containing additional data relating to the command, which may be provided to the storage device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Submission queues provide a mechanism by which a host may send a command to a storage device. A submission queue is typically implemented as a circular buffer, often stored in the host memory, with entries of a fixed size, typically 64 bytes. When the host wants to issue a new command to the storage device, the host may place one or more entries in a submission queue. The host may then "ring the doorbell" by writing a new value in a submission queue tail pointer in the storage controller. The new value may point to the most recent entry added to the submission queue. The storage controller may be alerted to the new submission queue entry by the update to the submission queue tail pointer, and may then read the submission queue entry from the submission queue. The storage controller may also update a submission queue head pointer, to reflect that a submission queue entry has been removed from the submission queue. The submission queue head and tail pointers may be thought of as pointers to the oldest and newest entries in the submission queue, so that the submission queue may operate as a first in, first out (FIFO) queue (although the storage device may take entries from the submission queue in any desired order).

Initially, the submission queue entry included relatively few fields of data, leaving much of the submission queue entry reserved for future purposes. Because fields were not used, manufacturers could use those reserved fields for their own purposes. As standards have evolved, more of the data in the submission queue entry has been assigned specific purposes, which may make those fields unavailable for other purposes.

Some embodiments of the disclosure address this problem by having the host determine rules that the storage device may use in setting values for particular fields in the submission queue entry. As the values for those fields may then be deterministically calculated by the storage device, the values for those fields may be omitted from the submission queue entry, and those fields in the submission queue entry may be repurposed. For example, the host might specify a rule regarding how the metadata pointer may be calculated by the storage device. In this manner, double words 4 and 5, which normally store the metadata pointer and occupy 8 bytes of data, may be repurposed for other uses.

Other embodiments of the disclosure address this problem by introducing a shadow queue. A shadow queue may be a second queue that may store additional data that might not fit into the submission queue entry in the submission queue. In some embodiments of the disclosure, the shadow queue may include as many entries as the submission queue: an entry in the shadow queue may correspond position-wise to the submission queue entry in the submission queue for which the shadow queue entry contains additional data. Such a shadow queue may be sparse, in that relatively few entries in the shadow queue may be expected to have additional data. In other embodiments of the disclosure, the shadow queue may be dense: that is, a relatively few number of entries (as compared with the submission queue), with entries added sequentially when there is additional data to be provided to the storage device. That is, with a dense shadow queue, consecutive entries may correspond to submission queue entries that are separated by 1 or more other submission queue entries (that did not have additional data to include).

The submission queue entry includes information indicating that there is a shadow queue entry with additional data. In addition, in some embodiments of the disclosure, the shadow queue entry may include information that may allow the shadow queue entry to be paired with the submission queue entry. For example, the shadow queue might have entries that are numbered, and unused bits in the submission queue entries may be used to identify a particular shadow queue entry by number. Or, the shadow queue entry might include information, such as an operation code (opcode) or a command identifier, copied from the submission queue entry, which would enable pairing the shadow queue entry with the submission queue entry.

Shadow queues might or might now have their own doorbell. For example, sparse shadow queues might not require a doorbell (since entries in the submission queue and the shadow queue may be synchronized, whereas dense shadow queues might use a doorbell. In some embodiments of the disclosure, the submission queue and the shadow queue may be emptied at different rates. For example, if the doorbell for a dense shadow queue is rung, the storage device might retrieve some or all of the entries in the shadow queue, even though the corresponding entries in the submission queue might still be pending.

Shadow queue entries may be of a different size than submission queue entries.

FIG. 1 shows a machine including a processor and storage device to support submission queue entries for commands sent to the storage device, according to embodiments of the disclosure. In FIG. 1, machine 105, which may also be termed a host or a system, may include processor 110, memory 115, and storage device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Storage device 120 may be used to store data that may be termed "long-term": that is, data that is expected to be stored for longer periods of time, or that does not need to be stored in memory 115. Storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives (HDDs) and Solid State Drives (SSDs). Any reference to "SSD" below should be understood to include other embodiments of the disclosure, such as HDDs or other storage device forms.

Embodiments of the disclosure may include any desired mechanism to communicate with storage device 120. For example, storage device 120 may connect to one or more busses, such as a Peripheral Component Interconnect Express (PCIe) bus, or storage device 120 may include Ethernet interfaces or some other network interface. Other potential interfaces and/or protocols to storage device 120 may include NVMe, NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and Compute Express Link® (CXL®) among other possibilities. (Compute Express Link and CXL are registered trademark of the Compute Express Link Consortium, Inc. in the United States.)

Figure 2:
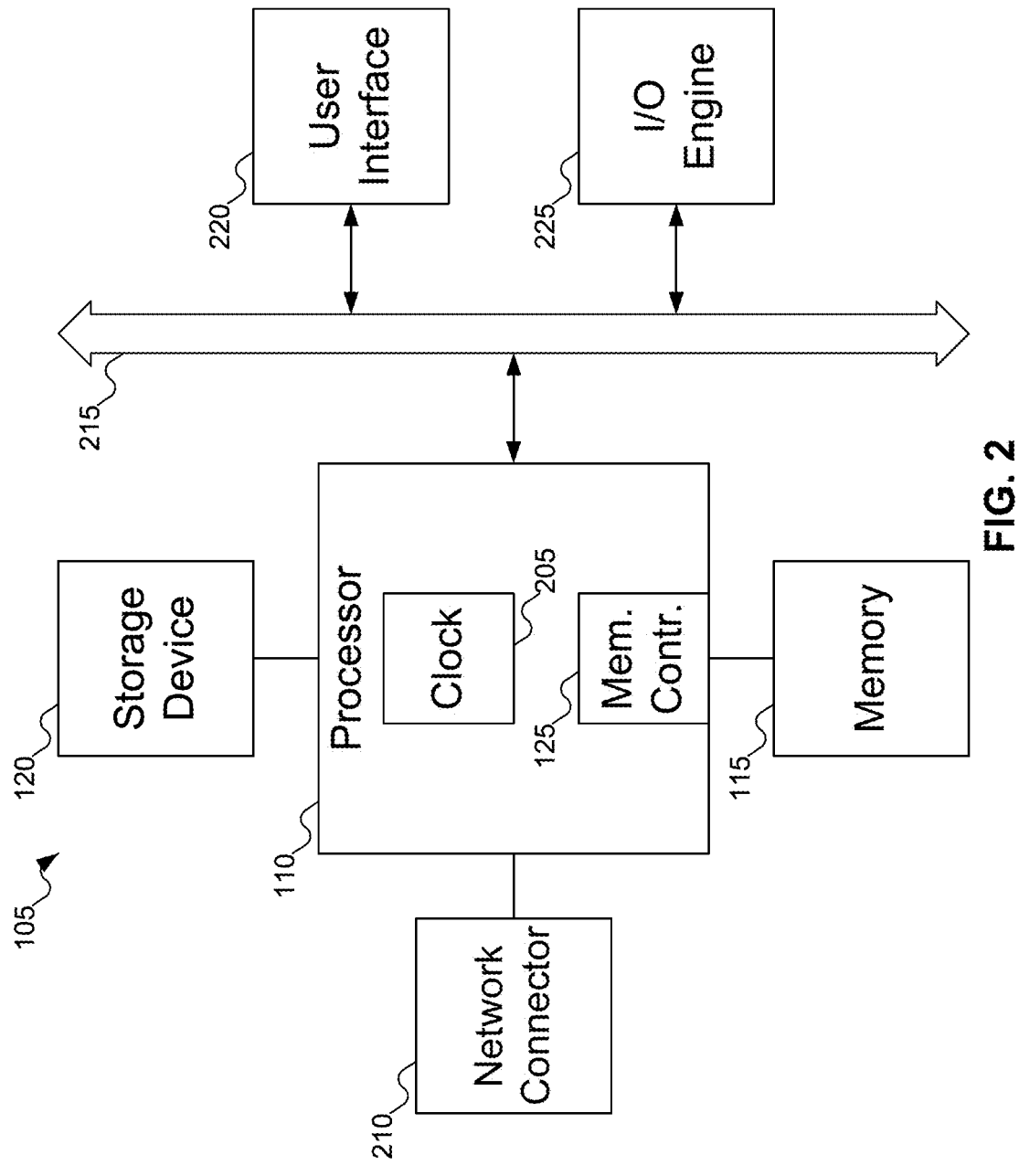
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
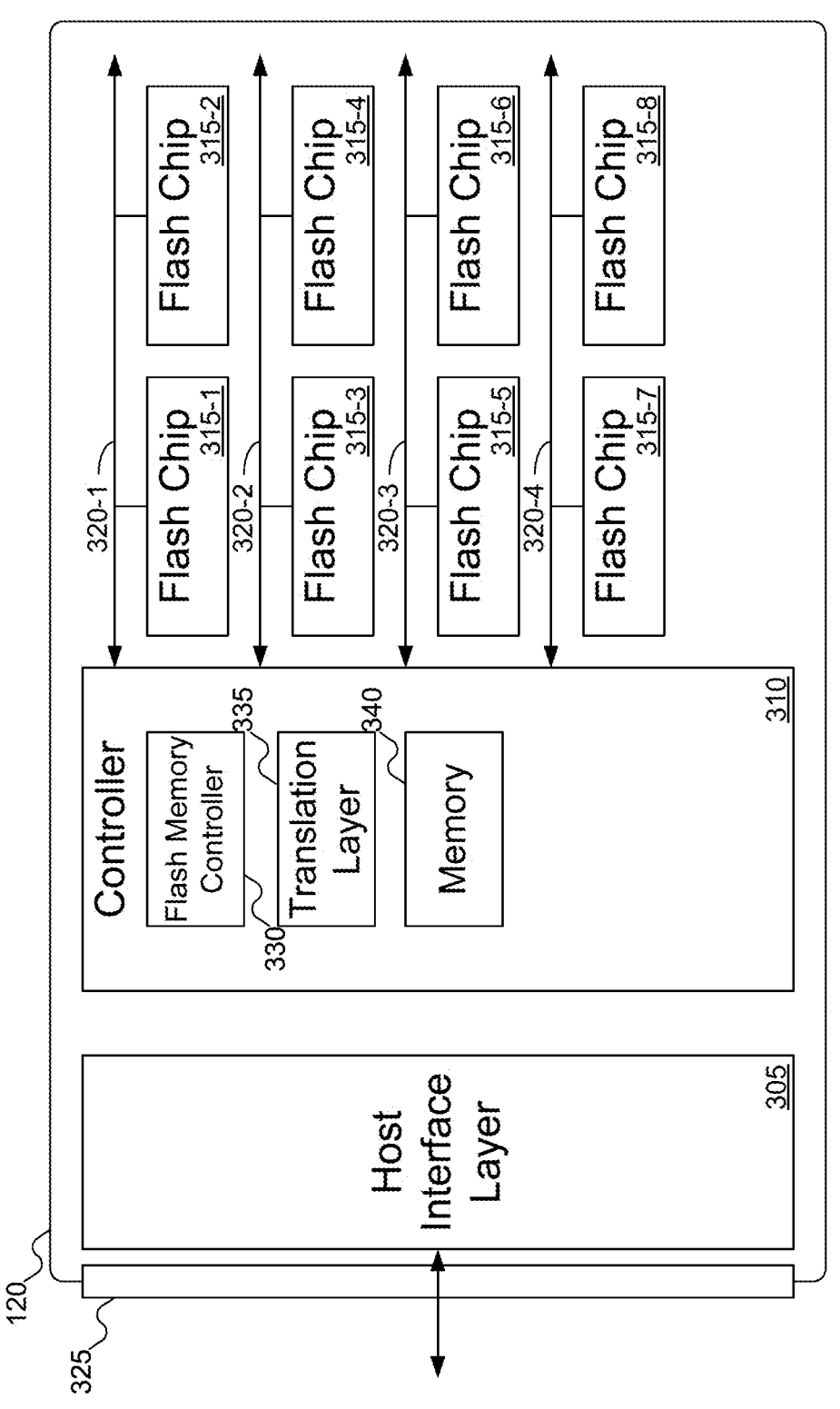
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage"), which may be organized into various channels 320-1 through 320-4. Host interface layer 305 may manage communications between storage device 120 and other components (such as processor 110 of FIG. 1). Such communication may be through, for example, a connector, such as connector 325. Host interface layer 305 may also manage communications with other devices aside from processor 110 of FIG. 1: for example, other storage devices (either local to or remote from machine 105 of FIG. 1) or remote processors. Communications with remote device may be handled, for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315-1 through 315-8 using flash memory controller 330. SSD controller 310 may also include flash translation layer 335, which may manage the mapping of logical block addresses (LBAs) (as used by processor 110 of FIG. 1) to physical block addresses (PBAs) where the data is actually stored on storage device 120. By using flash translation layer 335, processor 110 of FIG. 1 does not need to be informed when data is moved from one block to another within storage device 120. Controller 310 may also include memory 340, which controller 310 may use for local processing. For example, controller 310 may use memory 340 as a buffer for data being received from or sent to processor 110 of FIG. 1.

While FIG. 3 shows storage device 120 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits.

Figure 4:
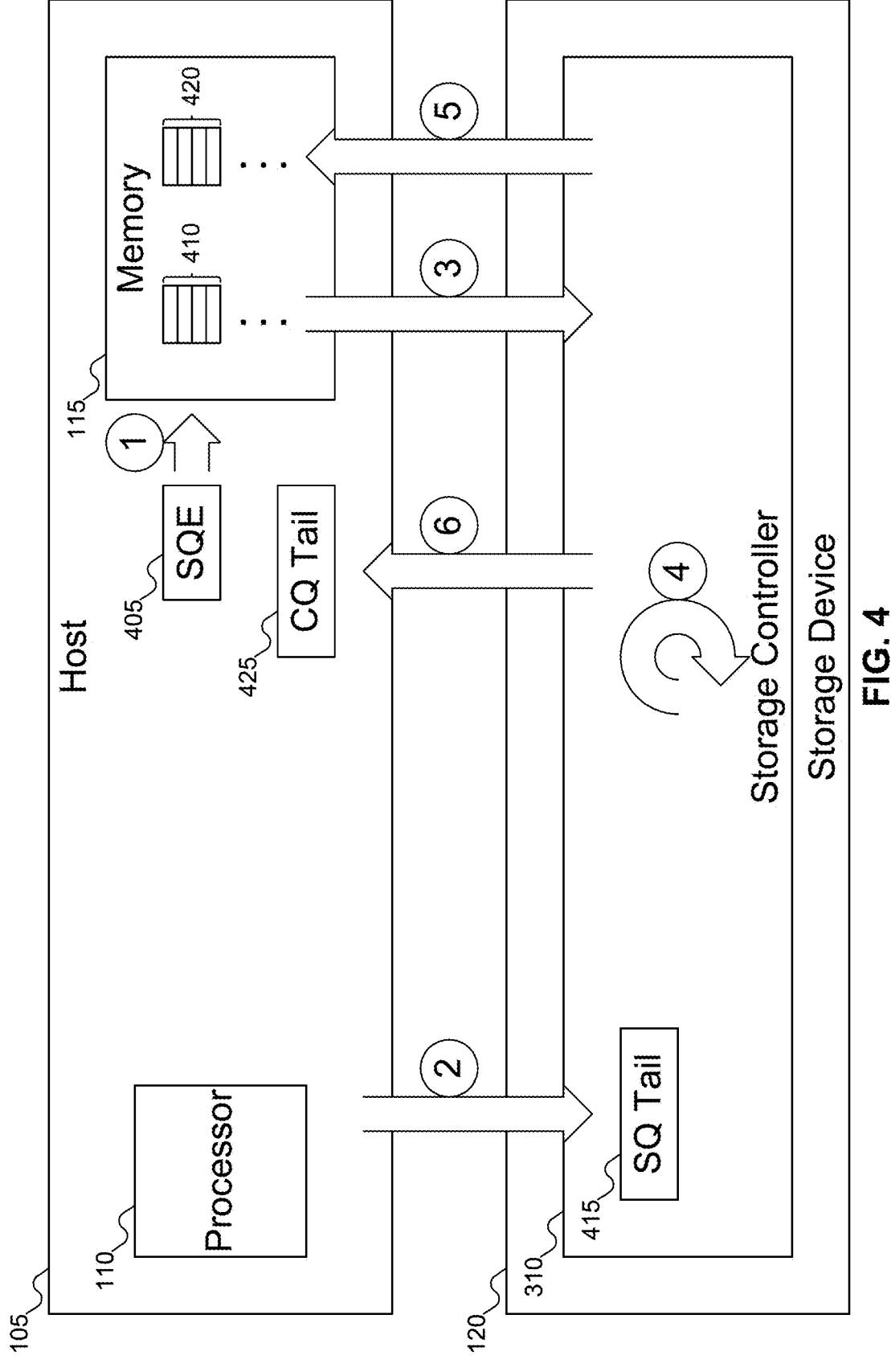
FIG. 4 shows the process of submitting a command to the storage device of FIG. 1 using a submission queue entry, according to embodiments of the disclosure.

FIG. 4 shows the process of submitting a command to storage device 120 of FIG. 1 using a submission queue entry, according to embodiments of the disclosure. In FIG. 4, host 105 (more specifically, processor 110 of FIG. 1) may establish submission queue entry (SQE) 405 (SQE 405 may also be referred to as data structure 405). SQE 405 may contain information about the particular request or command processor 110 is sending to storage device 120.

Figure 5:
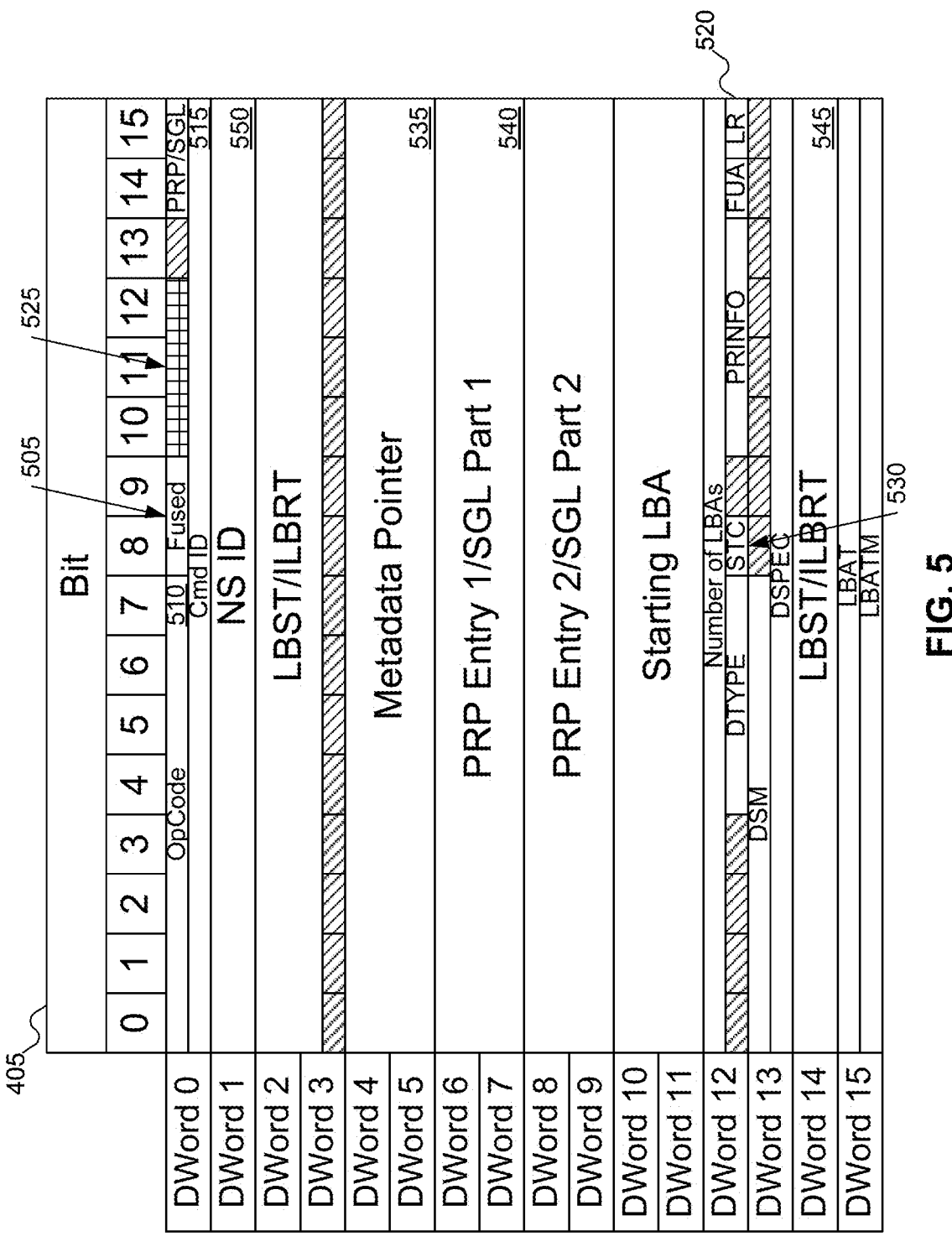
FIG. 5 shows details of the submission queue entry of FIG. 4 for a write command to be submitted to the storage device of FIG. 1, according to embodiments of the disclosure.

FIG. 5 shows details of SQE 405 of FIG. 4 for a write command to be submitted to storage device 120 of FIG. 1, according to embodiments of the disclosure. Different commands may structure SQEs differently, but embodiments of the disclosure are applicable to any SQE, regardless of how structured or what command is specified in the SQE.

SQE 405 includes various fields. For example, SQE 405 may include fields such as Fused 505, operation code (opcode) 510, command identifier (ID) 515, and Limited Retry 520. SQE 405 may also include various other fields as shown. Table 1 below shows the meanings of the various acronyms used in FIG. 5.

TABLE 1

| Table of Acronyms | |
| --- | --- |
| PRP | Physical Region Page |
| STC | Self-test Code |
| SGL | Scatter Gather List |
| FUA | Force Unit Access |
| LBST | Logical Block Storage Tag |
| DSM | Dataset Management |
| ILBRT | Initial Logical Block Reference Tag |
| DSPEC | Directive Specific |
| LBA | Logical Block Address |
| LBAT | Logical Block Application Tag |
| LBATM | Logical Block Application Tag Mask |
| LR | Limited Retry |
| opcode | Operation Code |
| CMD ID | Command Identifier |
| NS ID | Namespace Identifier |
| DTYPE | Directive Type |
| PRINFO | Protection Information Field |

Returning to FIG. 4, after SQE 405 has been established, processor 110 may add SQE 405 to submission queue 410. The addition of SQE 405 to submission queue 410 is shown in FIG. 4 as operation 1 (represented as a circle with the number 1 inside it). Processor 110 may then update submission queue tail pointer 415 in storage controller 310 of storage device 120, shown as operation 2. By updating submission queue tail pointer 415, processor 110 may inform storage device 120 that SQE 405 has been added to submission queue 410: submission queue tail pointer 415 may function as a doorbell being rung by processor 110. Note that other techniques may also be used to notify storage device 120 that SQE 405 has been added to submission queue 410. For example, submission queue tail pointer 415 might be stored in memory 115 of host 105, with another register in storage controller 310 being used as a doorbell: storage controller 310 might then read the value from submission queue tail pointer 415. Or, processor 110 might use an interrupt to inform storage device 120 to the new entry in submission queue 410.

Regardless of how processor 110 might notify storage device 120 that SQE 405 is in submission queue 410, once storage device 120 is aware, storage device 120 may read SQE 405 from submission queue 410, shown as operation 3. Storage device 120 may then execute the command specified by SQE 405, shown as operation 4.

Once storage device 120 has completed execution of the command, storage device 120 may add an entry to completion queue 420, shown as operation 5. Finally, storage device 120 may update completion queue tail pointer 425 to let processor 110 know that there is a new entry in completion queue 420. As with operation 2, operation 6 may be performed in other manners. For example, completion queue tail pointer 425 might be stored in storage device 120, and some register in processor 110 might act as a doorbell to alert processor 110 to the new entry in completion queue 420, or storage device 120 might use an interrupt to inform processor 110 to the new entry in completion queue 420. Head and tail doorbells may also be referred to as head and tail pointers.

Various other operations, not shown in FIG. 4, may also be part of the processing of SQE 405. For example, submission queue 410 and completion queue 420 may have head pointers, which may be used in removing entries from the queues: these head pointers are not shown in FIG. 4. Nor does FIG. 4 show what processor 110 might do after removing the entry from completion queue 420.

While FIG. 4 suggests that submission queue tail pointer 415 is stored in storage controller 310 and completion queue tail pointer 425 is stored in host 115, embodiments of the disclosure may place these elements (along with the corresponding queue head pointers) anywhere desired. For example, all four pointers might be in storage controller 310, or all four pointers might be in processor 110, or the four pointers may be distributed in any desired manner between processor 110 and storage controller 310.

While FIG. 4 shows one submission queue 410 and one completion queue 420, in some embodiments of the disclosure there may be more than one submission queue 410 and/or more than one completion queue 420 for use with storage device 120. For example, in some embodiments of the disclosure, the NVMe specification may support up to 65,536 submission queues 410 and 65,536 completion queues 420 (one submission queue and one completion queue may be used for administrative purposes, with the remaining queues used for input/output (I/O) purposes). The number of submission queues 410 and/or completion queues 420 may depend on the system configuration and/or performance requirements.

In addition, the size of submission queues 410 and/or completion queues 420 may vary. Administrative queues may include up to 4096 entries, whereas I/O queues may include up to 65,536 entries. Thus, at one extreme, there may be a total of 4,294,905,856 SQEs (65,536 SQEs in each of 65,535 I/O queues, plus 4096 SQEs in an administrative queue). Like the number of submission queues 410 and/or completion queues 420, the depth of the various queues may also be configured for the system.

Figure 6:
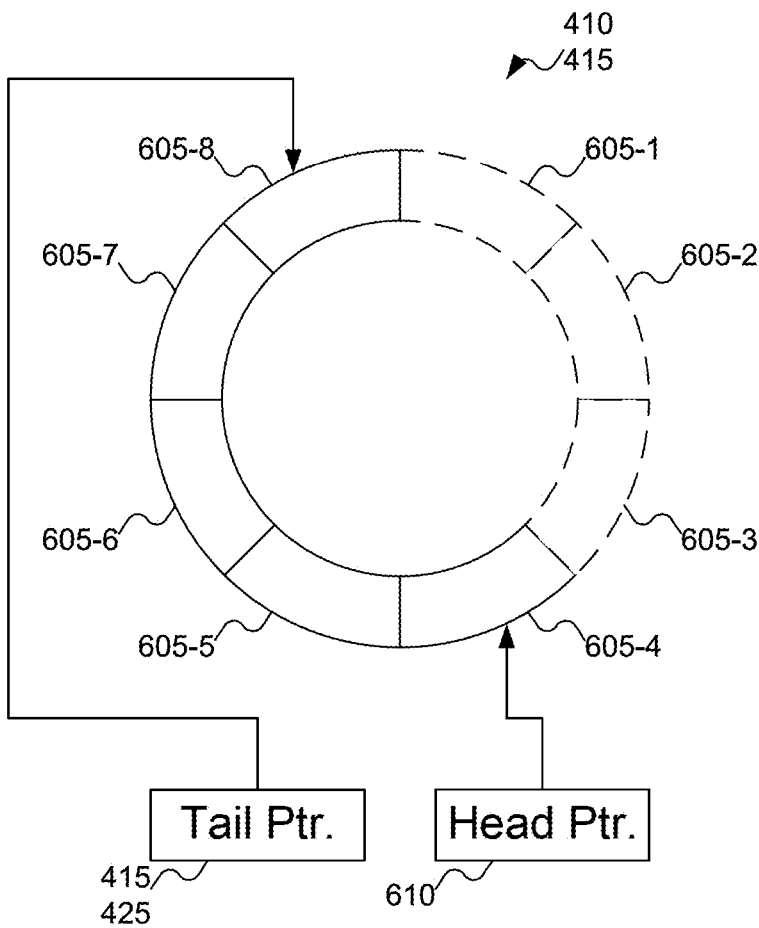
FIG. 6 shows a high-level representation of the submission queue of FIG. 4, according to embodiments of the disclosure.

FIG. 6 shows a high-level representation of submission queue 410 of FIG. 4, according to embodiments of the disclosure. In FIG. 6, submission queue 410 (and completion queue 420 as well) are shown as circular arrays. As implemented, submission queue 410 might not be "circular" per se, but may be stored in a block of memory that may have a lower address and an upper address: when an SQE has been added at the end of the block of memory, the next SQE may be added at the other end of the block of memory, thus achieving a "circular" implementation. Additionally, while submission queue 410 and/or completion queue 420 is shown in FIG. 6 as using a contiguous memory space, other embodiments of the disclosure may implement submission queue 410 (and/or completion queue 420) using noncontiguous blocks of memory, with the memory blocks being iterated in a sequential order before starting again at the beginning.

As shown in FIG. 6, submission queue 410 includes eight entries 605-1 through 605-8 (which may be referred to collectively as entries 605). Tail pointer 415 (for submission queue 410; for completion queue 420, tail pointer 425 may be used) may point to the most recently added entry, whereas head pointer 610 may point to the oldest entry (and therefore the entry to be removed first). Thus, as shown in FIG. 6, queue 410/420 currently includes (in order of entry into queues 410/420) entries 605-4, 605-5, 605-6, 605-7, and 605-8. Note that if the entry after tail pointer 415/425 is head pointer 610, then queue 410/420 is full, and if tail pointer 415/425 and head pointer 610 both point to the same entry, then queue 410/420 is empty.

Turning back to FIG. 5, as noted above, SQE 405 may have a specific structure. This structure may be defined according to a specification. As an example, the current specification for Non-Volatile Memory Express (NVMe Specification 2.0c), which is incorporated by reference herein for all purposes, defines the structure of SQE 405 as shown in FIG. 5. According to this specification, SQE 405 may include a total of 64 bytes of data. At this time, only 33 bits are not currently used in one field or another for an SQE sending a write command to storage device 120. These bits are shown with cross-hatching in FIG. 5. Put another way, SQE 405 is currently approximately 93.5% in use. Other technical proposals are currently being considered, which may further reduce the number of bits unallocated. For example, the Key Per Input/Output (KPIO) technical proposal, if adopted, may use 16 bits that are not currently allocated. A write command may be identified by the write opcode in SQE 405: other commands may have different opcodes. Other commands may have different structures, different sizes, and different numbers of bits that are not currently used.

While the size of SQE 405 could be increased beyond 64 bytes, changing the size of SQE 405 might involve changing how storage device 120 of FIG. 1 reads and processes SQEs, which might prevent backward compatibility with existing hardware. Thus, other techniques to support additional data delivery to storage device 120 of FIG. 1 are desired.

FIGS. 4 and 6 suggest that submission queue 410 (and completion queue 415 as well) may use a contiguous block of memory 115 of FIG. 1. But other embodiments of the disclosure may support queues 410 and/or 415 using noncontiguous blocks of memory. That is, a queue might use two or more different blocks of memory 115 of FIG. 1. In addition, each queue 410 and/or 415 may use different blocks of memory of different sizes, and may be independently located within memory 115 of FIG. 1. For example, one queue 410 or 415 might use a single contiguous block of memory 115 of FIG. 1, another queue 410 or 415 might use three noncontiguous blocks of memory, a third queue 410 or 415 might use 4 noncontiguous blocks of memory, and so on.

Embodiments of the disclosure may attempt to address the space available in SQE 405 by using a shadow queue entry. A shadow queue entry may be another location in memory where additional data may be stored. The shadow queue entry may be the same size as SQE 405, or it may be a different size. There are various different techniques that may be used to link SQE 405 with the shadow queue entry. How shadow queue entries may be used to provide additional space for data relating to the command in SQE 405 is discussed with reference to FIGS. 7-18 below.

Figure 7A:
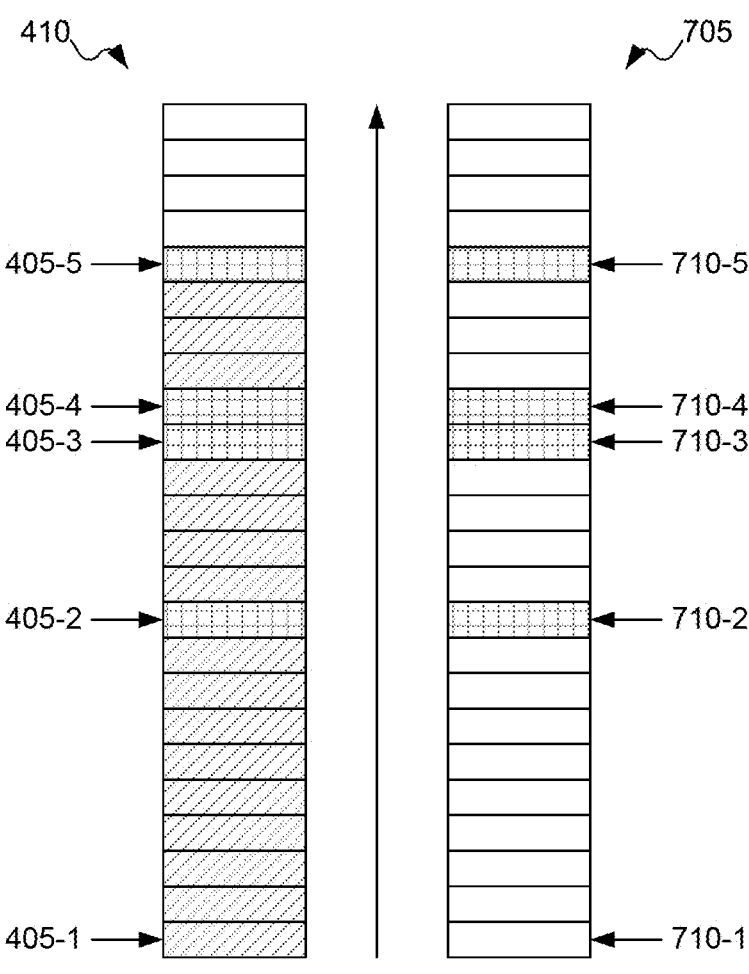
FIG. 7A shows the submission queue of FIG. 4 with a sparse shadow queue to store additional data relating to a command in the submission queue entry of FIG. 4 in the submission queue of FIG. 4, according to embodiments of the disclosure.

FIG. 7A shows submission queue 410 of FIG. 4 with a sparse shadow queue to store additional data relating to a command in submission queue entry 405 of FIG. 4 in submission queue 410 of FIG. 4, according to embodiments of the disclosure. In FIG. 7A, submission queue 410 may be paired with shadow queue 705 (which may also be referred to as mirror queue 705), which may also be stored in memory 115 of FIG. 1. Shadow queue 705 may include one entry to correspond with each entry in submission queue 410. Thus, when an SQE is added to submission queue 410 and there is more data than there is room for in the SQE, a shadow queue entry (which may also be referred to as a shadow entry or a data structure) may be added to shadow queue 705.

The shadow queue entry may be added to shadow queue 705 in a position corresponding to the position of SQE 405 in submission queue 410. For example, in FIG. 7A, SQEs 405 that have corresponding shadow queue entries 710 in shadow queue 705 are shown with square crosshatching, while SQEs 405 without corresponding shadow queue entries 710 are shown with diagonal crosshatching (and entries in submission queue 405 that are not currently filled are blank). Shadow queue entries 710 in shadow queue 705 may be crosshatched similarly. Thus, SQE 405-1 does not have a parallel entry in shadow queue 705, so shadow queue entry 710-1 is blank. But SQEs 405-2, 405-3, 405-4, and 405-5 may have shadow queue shadow queue entries 710-2, 710-3, 710-4, and 710-5 in shadow queue 705, in the corresponding positions. For example, SQE 405-5 is fifth from the top (at least, as depicted in FIG. 7A) of submission queue 410, and shadow queue entry 710-5, the corresponding shadow queue entry, is also fifth from the top of shadow queue 705.

By having shadow queue entries 710 be in positions corresponding to SQEs 405, storage device 120 of FIG. 1 may easily locate the corresponding shadow queue entry 710. In some embodiments of the disclosure, storage device 120 of FIG. 1 may assume that every SQE 405 has a corresponding shadow queue entry 710, and may retrieve the corresponding shadow queue entry 710 automatically. In such embodiments of the disclosure, processor 110 of FIG. 1, when writing shadow queue entry 710 to shadow queue 705, may set a bit in shadow queue entry 710; when storage device 120 of FIG. 1 reads shadow queue entry 710, storage device 120 of FIG. 1 may clear this bit. In this manner, storage device 120 of FIG. 1 may avoid accidentally using data from an earlier shadow queue entry 710 when that shadow queue entry 710 is next encountered.

In other embodiments of the disclosure, processor 110 of FIG. 1 may set a flag in SQE 405, so that storage device 120 of FIG. 1 may know when shadow queue entry 710 is present in shadow queue 705. For example, any currently unused bit in SQE 405, as shown in FIG. 5, could be used, such as bit 10 of double word 0. Alternatively, a field in SQE 405 may be used but set to a value that is normally not valid: for example, Fused 505 of FIG. 5 might be set to 11, which is not a recognized value for that field. When storage device 120 of FIG. 1 reads SQE 405 from submission queue 410 and sees that flag set, storage device 120 of FIG. 1 may then read the corresponding shadow queue entry 710 from shadow queue 705.

Since each SQE 405 in submission queue 410 may have a corresponding shadow queue entry 710 in shadow queue 705, shadow queue 705 may be the same size (same number of entries) as submission queue 410. But it may be expected that relatively few shadow queue entries 710 may be used in shadow queue 705. Thus, shadow queue 705 may be termed a sparse shadow queue (or spare mirror queue). But if relatively few shadow queue entries 710 in shadow queue 705 are used, then there may be a large amount of wasted space. After all, if submission queue 405 includes up to 65,536 entries, then shadow queue 710 would also include 65,536 entries. If each shadow queue entry 710 is 16 bytes in size, that means that shadow queue 710 would use 1,048,576 bytes (approximately 1 megabyte (MB)). While not a large amount of RAM—modern computer systems typically have many thousand times that much RAM— wasted memory is wasted memory, whether or not large in quantity. And if processor 110 of FIG. 1 implements more than one submission queue 405, then the number of shadow queues 705 may similarly increase, which may use additional RAM.

Figure 7B:
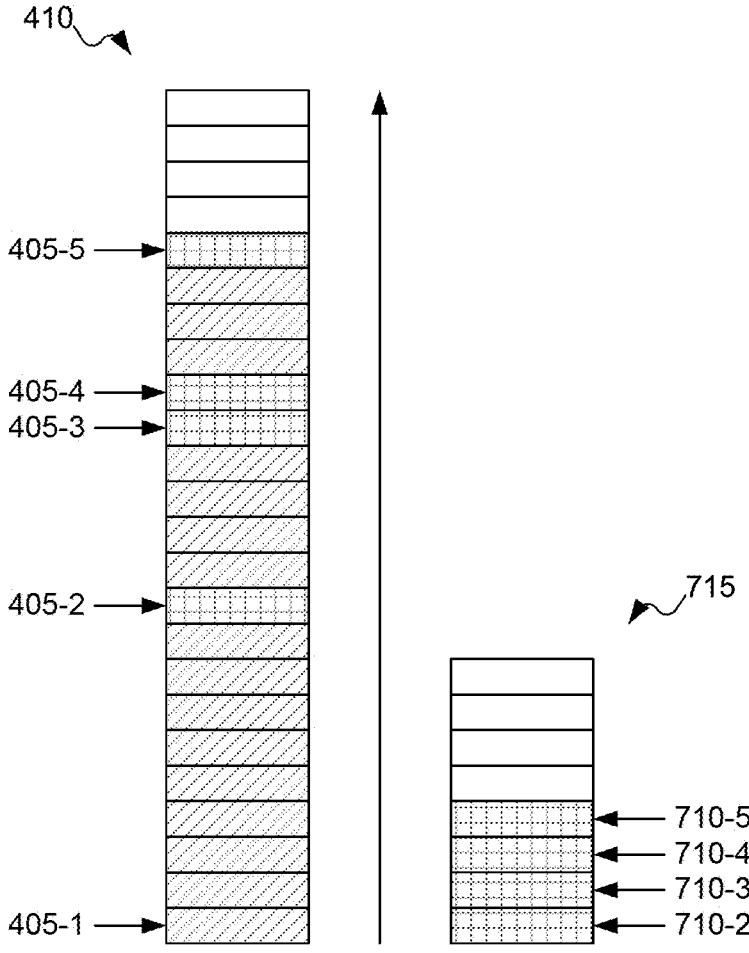
FIG. 7B shows the submission queue of FIG. 4 with a dense shadow queue to store additional data relating to a command in the submission queue entry of FIG. 4 in the submission queue of FIG. 4, according to embodiments of the disclosure.

A solution to avoid this wasted memory is to use a dense shadow queue, as shown in FIG. 7B. In FIG. 7B, rather than having shadow queue 715 include one entry 710 for each SQE 405 in submission queue 410, shadow queue 715 may have a somewhat smaller number of entries, which may be filled as needed. Because shadow queue 715 (which may also be referred to as dense shadow queue 715 or dense mirror queue 715) may have fewer shadow queue entries 710, shadow queue 715 may use less memory 115 of FIG. 1, and therefore there is less wasted memory devoted to shadow queue entries 710 that are not being used. For example, while there are numerous SQEs 405 separating SQEs 405-2, 405-3, 405-4, and 405-5 (the SQEs 405 that have additional data relating to the command stored in shadow queue 715), shadow queue entries 710-2, 710-3, 710-4, and 710-5

But because there are SQEs 405 that do not have "corresponding" shadow queue entries 710 in shadow queue 715, another mechanism may be used to correlate SQEs 405 that have corresponding shadow queue entries 710. One technique that may be used, potentially in combination with other techniques described below, is for SQE 405 to include a flag indicating that SQE 405 has a shadow queue entry 710 in shadow queue 715. For example, any currently unused bit in SQE 405, as shown in FIG. 5, could be used, such as bit 10 of double word 0. Alternatively, a field in SQE 405 may be used but set to a value that is normally not valid: for example, Fused 505 of FIG. 5 might be set to 11, which is not a recognized value for that field. When storage device 120 of FIG. 1 reads SQE 405 from submission queue 410 and sees that flag set, storage device 120 of FIG. 1 may then read the corresponding shadow queue entry 710 from shadow queue 715. Using such a flag may simplify the process for storage device 120 of FIG. 1 to match SQE 405 with shadow queue entry 710: if no flag is set, there is no shadow queue entry 710 to find.

Another technique, which may work in conjunction with a flag in SQE 405, to match SQE 405 and shadow queue entry 710 may be to have entries added to shadow queue 710 in the same order as SQEs 405 are added to submission queue 405. If queue ordering may be made parallel, then storage device 120 of FIG. 1 may know that the next entry 710 in shadow queue 715 contains additional data relating to the command for the next SQE 405 that has a flag set.

Yet another technique to match SQE 405 and shadow queue entry 710 is to include an identifier in SQE 405 that in some way uniquely identifies shadow queue entry 710. For example, some bits, such as those identified as field 525 of FIG. 5, may be used to store a value or an identifier. The value or identifier might be the position of the corresponding shadow queue entry 710 in shadow queue 715, or the value or identifier might be some value that uniquely identifies the pair of SQE 405 and shadow queue entry 710. The value or identifier may also be an index into shadow queue 705 or an offset into shadow queue 715. As shadow queue 715 may have some number of entries, this identifier might just need to distinguish among that many unique identifiers. Thus, for example, as shadow queue 715 in FIG. 7 is shown as including eight entries 710, three bits are sufficient to produce eight unique identifiers, which explains why field 525 of FIG. 5 includes three bits. (If shadow queue 715 may include more or fewer entries 710, the number of bits to be used to uniquely match SQE 405 and shadow queue entry 710 may be larger or smaller, as appropriate.

Yet another technique to match SQE 405 and shadow queue entry 710 is to include in shadow queue entry 710 some information that may be unique in SQE 405. For example, command ID 515 of FIG. 5 may be unique across all SQEs 405 (in fact, command ID 515 of FIG. 5 may be unique across all SQEs 405 whether currently in submission queue 410 or not). If shadow queue entry 710 includes command ID 515 of FIG. 5 somewhere in its data structure, storage device 120 of FIG. 1 may locate it based on SQE 405 including that command ID as well. Note that this approach is enhanced by including a flag in SQE 405 indicating that shadow queue entry 710 is in shadow queue 715 (since shadow queue 715 might be searched only if the flag is set in SQE 405), but the flag is not required: storage device 120 of FIG. 1 might search shadow queue entries 710 in shadow queue 715 for command ID 515 of FIG. 5 when SQE 405 is retrieved.

In some situations, it may be possible to use a value that is not necessarily unique in SQE 405. For example, given that relatively few SQEs 405 may need corresponding shadow queue entries 710, it may be sufficient to use a field such as opcode 510 of FIG. 5 to help identify the corresponding SQE 405. But this assumes that opcode 510 of FIG. 5 is unique among SQEs 405 in submission queue 410 have corresponding shadow queue entries 710 in shadow queue 705 and/or 715 of FIGS. 7A-7B: if multiple SQEs 405 with the same opcode 510 of FIG. 5 have corresponding shadow queue entries 710 in shadow queue 705 and/or 715 of FIGS. 7A-7B, then opcode 510 of FIG. 5 may be insufficient to pair SQE 405 with shadow queue entry 710.

As discussed above, processor 110 of FIG. 1 may notify storage device 120 of FIG. 1 that SQE 405 has been added to submission queue 410 using submission queue tail pointer 415 of FIG. 4. If sparse shadow queue 705 of FIG. 7A is used and entries 710 in shadow queue 705 of FIG. 7A are in corresponding positions to entries 405 in submission queue 410, then submission queue tail pointer 415 of FIG. 4 (and corresponding submission queue head pointer 610 of FIG. 6) may work for both submission queue 410 and shadow queue 705 of FIG. 7A.

But as entries 710 in shadow queue 715 of FIG. 7B do not have corresponding positions, shadow queue 715 of FIG. 7B may have its own tail pointer and head pointer. In this manner, storage device 120 of FIG. 1 may be able to track which entries 710 have been used. If shadow queue 715 of FIG. 7B has separate tail and head pointers, then shadow queue 715 of FIG. 7B may also have a separate doorbell to let storage device 120 of FIG. 1 know when a new shadow queue entry 710 has been added to shadow queue 715 of FIG. 7B. There might also be ordering constraints in the protocol where the shadow queue head and/or tail pointers are updated before the submission queue head and/or tail pointers are updated, to maintain ordering relationships. For example a drive parsing the SQE might expect the data in the corresponding shadow queue entry to be present to be able to process the corresponding SQE due to this ordering.

But there is another possibility. Instead of having tail and head pointers for shadow queue 715 of FIG. 7B, storage device 120 of FIG. 1 may use a phase bit, similar to the phase bit used with completion queue 420 of FIG. 4. A phase bit may identify whether shadow queue entry 710 is part of a current or previous iteration through shadow queue 715 of FIG. 7B.

A further explanation may be helpful. Initially, the phase bit in each shadow queue entry 710 may be set to 0. As storage device 120 of FIG. 1 reads shadow queue entries 710 from shadow queue 715, storage device 120 of FIG. 1 may change the phase bit in each shadow queue entry 710 in shadow queue 715 to 1. When storage device 120 of FIG. 1 encounters a shadow queue entry 710 in shadow queue 715 with the phase bit set to 1, storage device 120 of FIG. 1 may stop, knowing that all shadow queue entries 710 in shadow queue 715 have been checked. On the next pass, storage device 120 may set the phase bits in shadow queue entries 710 in shadow queue 715 back to 0: when storage device 120 of FIG. 1 encounters a shadow queue entry 710 in shadow queue 715 with the phase bit set to 0, storage device 120 of FIG. 1 again may stop.

Another way to use a phase bit is for processor 110 of FIG. 1 to set a phase bit to a particular value when writing shadow queue entries 710 into shadow queue 715, and for storage device 120 of FIG. 1 to clear that phase bit when storage device 120 of FIG. 1 reads shadow queue entries 710 from shadow queue 715. For example, a phase bit value of 1 may indicate that shadow queue entry 710 has yet to be read by storage device 120 of FIG. 1, and a phase bit value of 0 may indicate that shadow queue entry 710 has been read by storage device 120 of FIG. 1. (The roles of these values may be interchanged, and if more than one bit is used to indicate a phase, other values may be used instead).

It might be asked why this is helpful. After all, if only one shadow queue entry 710 is read from shadow queue 715 at a time, when SQE 405 indicates that there is a corresponding shadow queue entry 710 in shadow queue 715, what benefit does the phase bit provide? The answer lies in the unstated assumption: that storage device 120 of FIG. 1 accesses only one shadow queue entry 710 from shadow queue 715 at a time. For example, when storage device 120 of FIG. 1 reads SQE 405 and finds that the flag is set indicating that there is a shadow queue entry 710 in shadow queue 715, storage device 120 of FIG. 1 might read more than one shadow queue entry 710 from shadow queue 715, and may buffer the others (much like how storage device 120 of FIG. 1 may retrieve more than one SQE 405 at a time from submission queue 410). (Buffering shadow queue entries 710 read from shadow queue 715 may also enable out-of-order processing of SQEs 405 by storage device 120 of FIG. 1.) By reading shadow queue entries 710 from shadow queue 715 in advance, storage device 120 of FIG. 1 may reduce the number of accesses to memory 115 of FIG. 1, which may save some time. By using a phase bit, storage device 120 of FIG. 1 may track which shadow queue entries 710 have been read and which have not.

There is another complication with using shadow queue 715 of FIG. 7B. When processor 110 of FIG. 1 uses sparse shadow queue 705 of FIG. 7A, processor 110 of FIG. 1 knows that the two queues will be full at the same time: if shadow queue 705 of FIG. 7A does not have room for shadow queue entry 710 in a particular position, then submission queue 410 likewise lacks space for SQE 405. But when processor 110 of FIG. 1 uses dense shadow queue 715 of FIG. 7B, it is possible for submission queue 410 to have room for SQE 405 but dense shadow queue 715 of FIG. 7B might not have room for shadow queue entry 710. Thus, processor 110 of FIG. 1 may need to track whether shadow queue 715 of FIG. 7B is full or not: if shadow queue 715 of FIG. 7B is full, then processor 110 of FIG. 1 might have to wait to add SQE 405 to submission queue 410.

There are various different ways for processor 110 of FIG. 1 to determine whether shadow queue 715 of FIG. 7B is full (which may be referred to as backpressure). One approach is to use the phase bit. As discussed above, storage device 120 of FIG. 1 may set a phase bit to track which shadow queue entries 710 have been retrieved. Processor 110 of FIG. 1 may also use this phase bit to determine if shadow queue 715 of FIG. 7B is full: if the next entry (after the shadow queue tail pointer) has the same phase bit as shadow queue entry 710 pointed to by the shadow queue tail pointer, then shadow queue 715 of FIG. 7B is full. In some embodiments of the disclosure, processor 110 of FIG. 1 and storage device 120 of FIG. 1 may agree to always leave a blank shadow queue entry 710, to allow for distinguishing between the cases where shadow queue 715 of FIG. 7B is full and shadow queue 715 of FIG. 7B is empty (both of which would have all shadow queue entries 710 with the same phase bit).

Another approach is to use the head and tail pointers for shadow queue 715 of FIG. 7B. Processor 110 of FIG. 1 may determine whether shadow queue 715 of FIG. 7B is full by considering the head and tail pointers for shadow queue 715 of FIG. 7B. If the head pointer for shadow queue 715 of FIG. 7B immediately follows the tail pointer for shadow queue 715 of FIG. 7B, then shadow queue 715 of FIG. 7B is full. (This model assumes a circular queue implementation for shadow queue 715 of FIG. 7B. If shadow queue 715 of FIG. 7B is implemented using other data structures, then other tests may be used to determine whether or not shadow queue 715 of FIG. 7B is full).

Yet another possibility is for processor 110 of FIG. 1 to monitor the state of submission queue 410 of FIG. 4, and extrapolate when entries are consumed and freed from shadow queue 715 of FIG. 7B. For example, processor 110 of FIG. 1 might examine SQEs 405 of FIG. 4 in submission queue 410 of FIG. 4, and determine how many SQEs 405 of FIG. 4 in submission queue 410 of FIG. 4 indicate that there are corresponding shadow queue entries 710 in shadow queue 715 of FIG. 7B. Combined with the known size of shadow queue 715 of FIG. 7B, processor 110 of FIG. 1 may determine how many shadow queue entries 710 in shadow queue 715 of FIG. 7B are consumed and how many are free.

The impact of shadow queue 715 of FIG. 7B filling before submission queue 410 fills may be minimized by storage device 120 of FIG. 1 prefetching shadow queue entries 710 from shadow queue 715 of FIG. 7B (at least, prefetching shadow queue entries 710 before retrieving SQEs 405 that correspond to shadow queue entries 710). Keeping shadow queue 715 of FIG. 7B as empty as possible may help minimize the likelihood that shadow queue 715 of FIG. 7B may be full and cause processor 110 to wait for an opening in shadow queue 715 of FIG. 7B before adding SQE 405 to submission queue 410.

In FIGS. 7A-7B, submission queue 410 and sparse shadow queue 705 are shown as storing 24 entries, and dense shadow queue 715 is shown as storing eight entries. Embodiments of the disclosure may support any number of entries in submission queue 410, shadow queue 705, and dense shadow queue 715 (although as discussed above, sparse shadow queue 705 may have the same number of entries as submission queue 410), and may be larger or smaller than shown in FIGS. 7A-7B.

In FIGS. 7A-7B, shadow queue entries 710 are described as being added to shadow queues 705 and/or 715 of FIGS. 7A-7B. But in some embodiments of the disclosure, shadow queue entries 710 might be stored in memory 115 of FIG. 1, without being stored specifically in shadow queue 705 and/or 715 of FIG. 7A-7B. For example, various locations in memory may be allocated to store shadow queue entries 710, without shadow queue entries 710 necessarily being part of a "queue". In such embodiments of the disclosure, SQE 405 may include some information that may help to identify which location in memory 115 of FIG. 1 stores that particular shadow queue entry 710. For example, field 525 of FIG. 5 might store an identifier that may map (in some table stored in memory 115 of FIG. 1) to an address in memory 115 of FIG. 1 where shadow queue entry 710 is stored. In addition, while the above description states that shadow queue entry 710 is stored in memory 115 of FIG. 1, shadow queue entry 710 may also be stored in memory 340 of FIG. 3.

Regardless of how the additional information is associated with SQE 405 (via shadow queues 705 and/or 715 of FIGS. 7A-7B or stored somewhere in memory with information associated with shadow queue entries 710 to locate the additional information), controller 310 of FIG. 3 may then process the command using the data in both SQE 405 and the additional information (from shadow queue entry 710 and/or other memory locations).

Figure 8:
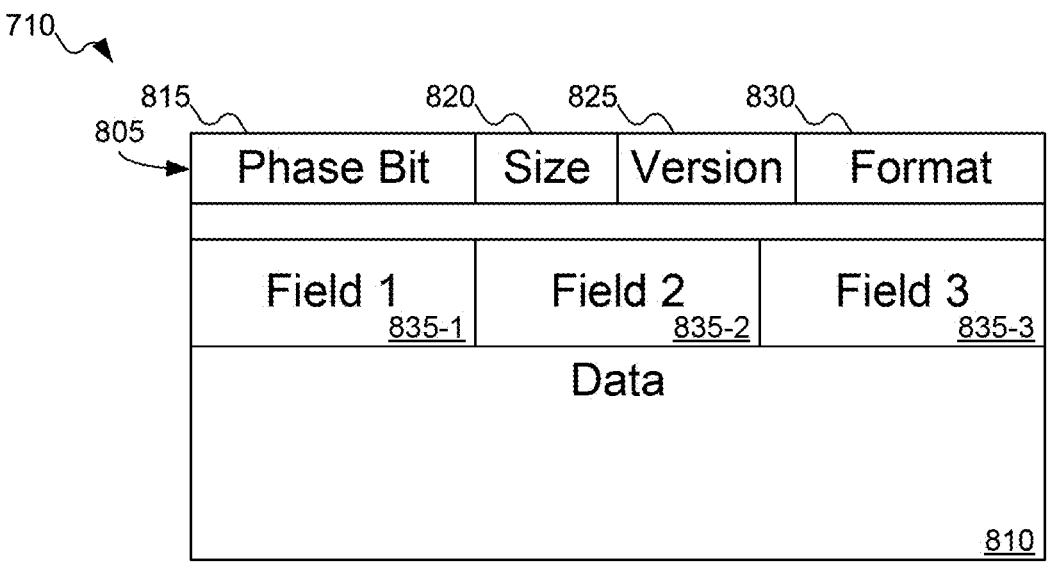
FIG. 8 shows details of the shadow queue entry of FIGS. 7A-7B in the shadow queues of FIGS. 7A-7B to store additional command data for the submission queue entry of FIG. 4 in the submission queue of FIG. 4, according to embodiments of the disclosure.

FIG. 8 shows details of shadow queue entry 710 of FIGS. 7A-7B in shadow queue 705 and/or 715 of FIGS. 7A-7B to store additional command data for submission queue entry 405 of FIG. 4 in submission queue 410 of FIG. 4, according to embodiments of the disclosure. In FIG. 8, shadow queue entry 710 may include two portions 805 and 810. Portion 805 may function as a header, storing various pieces of information that may govern how portion 810 may be interpreted. For example, portion 805 may include phase bit 815, size 820, version 825, and/or format 830. Phase bit 815 may be, for example, a bit indicating which iteration through shadow queues 705 or 715 of FIGS. 7A-7B includes shadow queue entry 710. Size 820 may be the size of the data stored in portion 810. Version 825 might specify a particular version of the data structure used in portion 810, which might indicate what fields are supported in portion 810 or other information, such as the size of portion 810. Finally, format 830 might specify a particular format used for the data in portion 810: for example, that the data is stored in eXtensible Markup Language (XML) format or JavaScript Object Notation (JSON) format.

In addition, portion 810 may include various fields, such as fields 835-1, 835-2, and 835-3 (which may be referred to collectively as fields 835). Fields 835 may store specific data expected for the command in SQE 405 of FIG. 4. For example, fields 835 might include command ID 515 of FIG. 5, enabling storage device 120 of FIG. 1 to pair shadow queue entry 710 with the correct SQE 405 of FIG. 4. Note that fields 835 might include more than just one value per field: for example, one field 835 might include both command ID 515 of FIG. 5 and opcode 510 of FIG. 5, to further ensure a correct pairing. Note also that not all fields are necessarily required. For example, processor 110 of FIG. 1 might provide data for fields 835-1 and 835-3, but not for field 835-2. Which fields 835 include data may depend on the command in SQE 405 of FIG. 4, and what additional data processor 110 of FIG. 1 wants to provide for that command.

Figure 9:
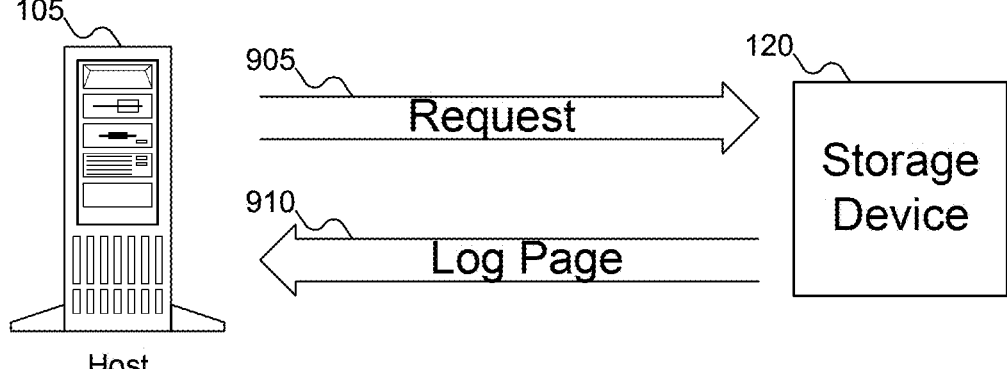
FIG. 9 shows the processor of FIG. 1 requesting and receiving a log page from the storage device of FIG. 1, for information about the structure of the shadow queue entry of FIG. 8, according to embodiments of the disclosure.

In some embodiments of the disclosure, storage device 120 of FIG. 1 may have expectations regarding what data is to be provided in shadow queue entry 710. For example, storage device 120 of FIG. 1 might expect the data in a particular format, or might be configured to support only certain fields in portion 810 of FIG. 8. FIG. 9 shows how processor 110 of FIG. 1 may request this information from storage device 120 of FIG. 1.

FIG. 9 shows processor 110 of FIG. 1 requesting and receiving a log page from storage device 120 of FIG. 1, for information about the structure of shadow queue entry 710 of FIGS. 7A-7B, according to embodiments of the disclosure. Processor 110 may send request 905 to storage device 120, which may respond in turn with log page 910. Log page 910 may be a log page that includes information about the expected structure of shadow queue entry 710 of FIGS. 7A-7B. For example, log page 910 may include information about size 820 of FIG. 8, version 825 of FIG. 8, format 830 of FIG. 8, or which fields 835 of FIG. 8 are supported by storage device 120. In this manner, processor 110 may establish shadow queue entry 710 of FIGS. 7A-7B in a manner consistent with the expectations (and capabilities) of storage device 120.

While FIG. 9 shows storage device 120 sending a log page in response to request 905, embodiments of the disclosure may also use other data structures or mechanisms to transfer information about the expected structure of shadow queue entry 710 of FIGS. 7A-7B. For example, the information may be conveyed in a message, in a vendor-specific data structure, via an NVMe Management Interface (NVMe-MI), or stored in a readable location in host 105 by storage device 120, such as a buffer, register, or a Vital Product Data in some form of Read-Only Memory (ROM), such as a Programmable Read-Only Memory (PROM), an Erasable Programmable Read-Only Memory (EPROM), or an Electrically Erasable Programmable Read-Only Memory (EE-PROM).

Processor 110 may send request 1005 for the log page to storage device 120 at any time. In some embodiments of the disclosure, processor 110 may send request 1005 during the boot process for machine 105 of FIG. 1. For example, processor 110 may discover storage device 120, as well as other devices included in machine 105 of FIG. 1, during a boot process. Processor 110 may then query storage device 120 for its data structures. If storage device 120 reports additional capabilities, such as support for additional SQE data, then processor 110 may send log page request 1005. Log page 1010 may then include all information about the additional capabilities of storage device 120, including what options storage device 120 has for supporting additional SQE data. Processor 110 may then send a request to set data (such as a Set Log Page request) to inform storage device 120 regarding what options processor 110 will use. Processor 110 may then finish the boot process, including creating submission queues 410 of FIG. 4 and completion queues 420 of FIG. 4. In addition, or alternatively, processor 110 may use Get Log Page and/or Set Log Page requests after the boot process, to achieve similar results.

As discussed above, in some embodiments of the disclosure, processor 110 may provide a clue to storage device 120 that shadow queue entry 710 of FIGS. 7A-7B is present and includes additional data relating to the command. For example, a flag may be set in SQE 405 of FIG. 4, indicating that shadow queue entry 710 of FIGS. 7A-7B has been used to store data relating to the command. This flag may be, for example, a bit or bits in SQE 405 of FIG. 4 that storage device 120 might otherwise ignore or consider to be in error. In some embodiments of the disclosure, a currently unused bit, such as bit 10 of double word 0, might be set to 1 to indicate that a memory area includes additional data relating to the command. In other embodiments of the disclosure, the Fused field (bits 8 and 9 of double word 0) may be set to 11. Since the value 11 in the Fused field is not defined, its use would not interfere with other uses of the Fused field.

The above discussion describes embodiments of the disclosure to support additional data being used with a submission queue entry. Other embodiments of the disclosure may also be applicable to completion queue entries stored in completion queues, or in other queues containing entries of fixed size. Such embodiments of the disclosure may operate similarly to how submission queue entries may support additional data, with potential appropriate changes in what component performs what operation (for example, storage controller 310 of FIG. 3 may store information in completion queue 420 of FIG. 4 and shadow queues 705 and/or 715 of FIGS. 7A-7B when shadow queues 705 and/or 715 of FIGS. 7A-7B are used to increase the amount of data stored in entries in completion queue 420 of FIG. 4). All such embodiments are considered part of this disclosure.

Figure 10:
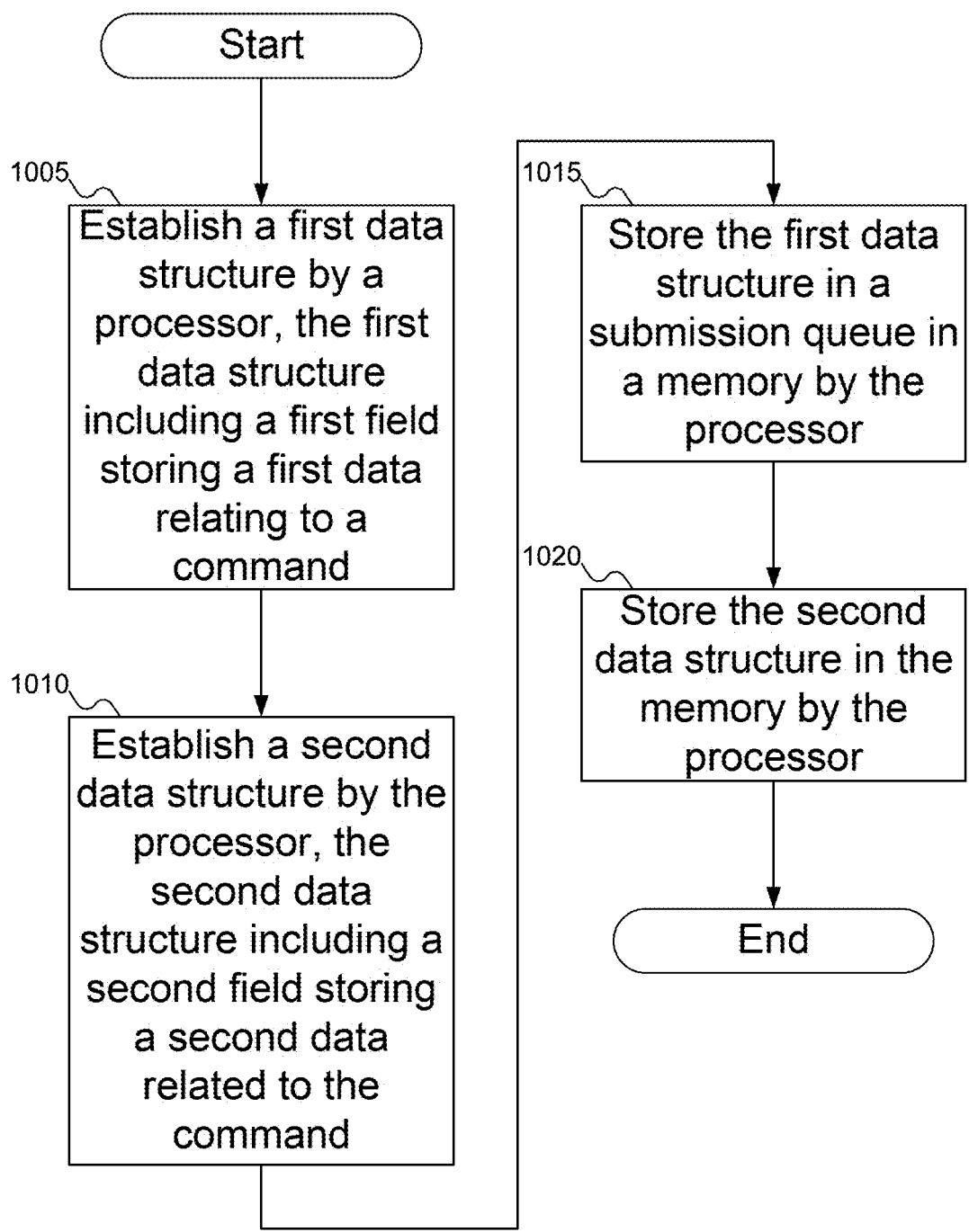
FIG. 10 shows a flowchart of an example procedure for the processor of FIG. 1 to establish the submission queue entry of FIG. 4 and the shadow queue entry of FIGS. 7A-7B for additional command data, according to embodiments of the disclosure.

FIG. 10 shows a flowchart of an example procedure for processor 110 of FIG. 1 to establish submission queue entry 405 of FIG. 4 and shadow queue entry 710 in FIGS. 7A-7B for additional command data, according to embodiments of the disclosure. In FIG. 10, at block 1005, processor 110 of FIG. 1 may establish SQE 405 of FIG. 4. SQE 405 of FIG. 5 may include data, such as opcode 510 of FIG. 5 and/or command ID 515 of FIG. 5, which may relate to a command. At block 1010, processor 110 of FIG. 1 may establish shadow queue entry 710 of FIGS. 7A-7B. Shadow queue entry 710 of FIGS. 7A-7B may also include data relating to the command. At block 1015, processor 110 of FIG. 1 may store SQE 405 of FIG. 4 in submission queue 410 of FIG. 4 in memory 115 of FIG. 1. Finally, at block 1020, processor 110 of FIG. 1 may store shadow queue entry 710 of FIGS. 7A-7B in memory 110 of FIG. 1.

Figure 11:
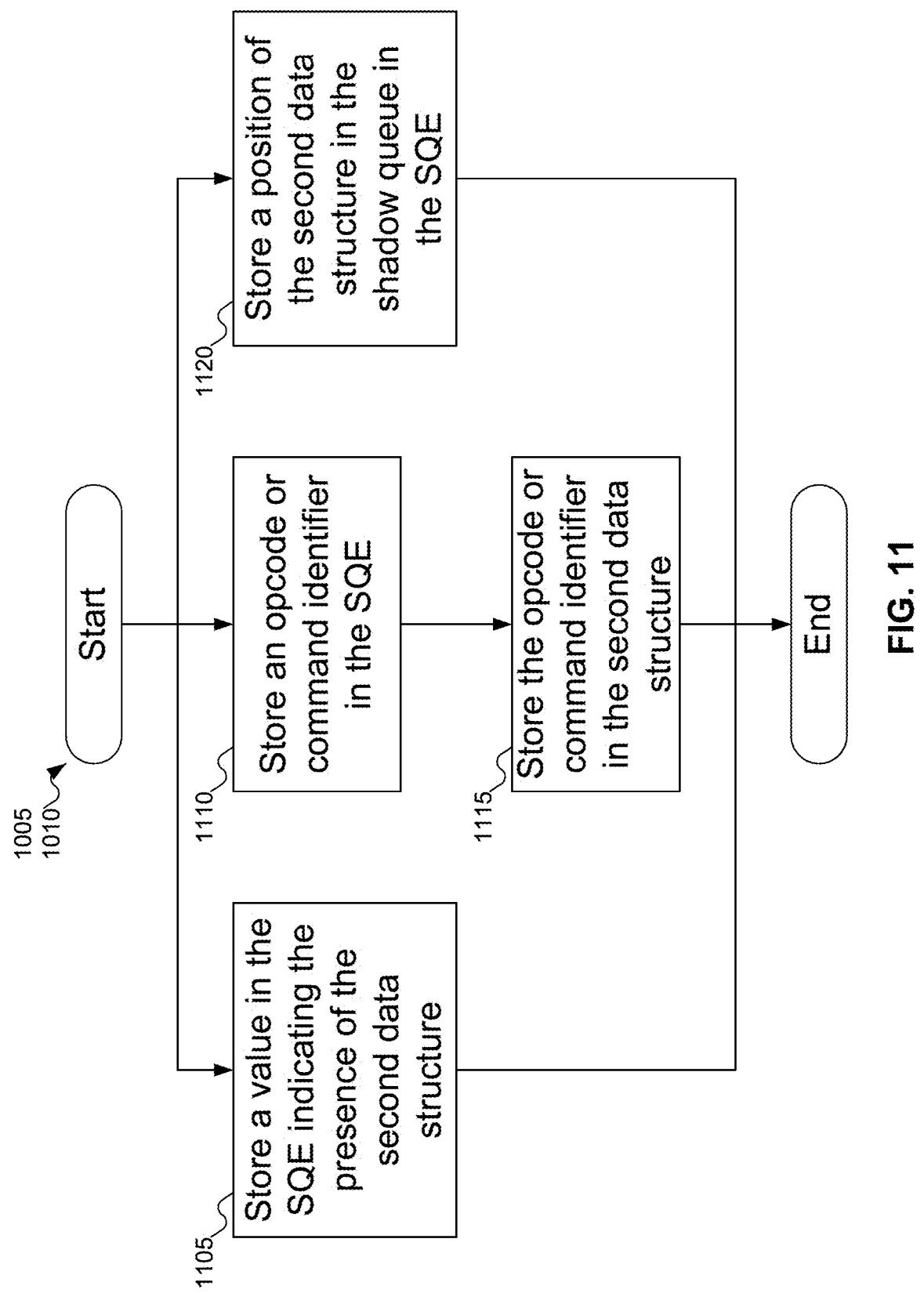
FIG. 11 shows a flowchart of an example procedure for the processor of FIG. 1 to assist the storage device of FIG. 1 in pairing the submission queue entry of FIG. 4 with the shadow queue entry of FIGS. 7A-7B, according to embodiments of the disclosure.

FIG. 11 shows a flowchart of an example procedure for processor 110 of FIG. 1 to establish a relationship between submission queue entry 405 of FIG. 4 and shadow queue entry 710 of FIGS. 7A-7B, according to embodiments of the disclosure. At block 1105, processor 110 of FIG. 1 may include a value, such as a flag, that may indicate the presence of shadow queue entry 710 of FIGS. 7A-7B in shadow queue 705 and/or 715 of FIGS. 7A-7B.

Alternatively, at block 1110, processor 110 of FIG. 1 may store data, such as opcode 510 of FIG. 5 and/or command ID 515 of FIG. 5, in SQE 405 of FIG. 4, and at block 1115, processor 110 of FIG. 1 may similarly include that data in shadow queue entry 710 of FIGS. 7A-7B.

Alternatively, at block 1120, processor 110 of FIG. 1 may store in SQE 405 of FIG. 4 an identifier of a position in shadow queue 705 and/or 715 of FIGS. 7A-7B where shadow queue entry 710 of FIGS. 7A-7B may be found.

Figures 12, 13, 14:
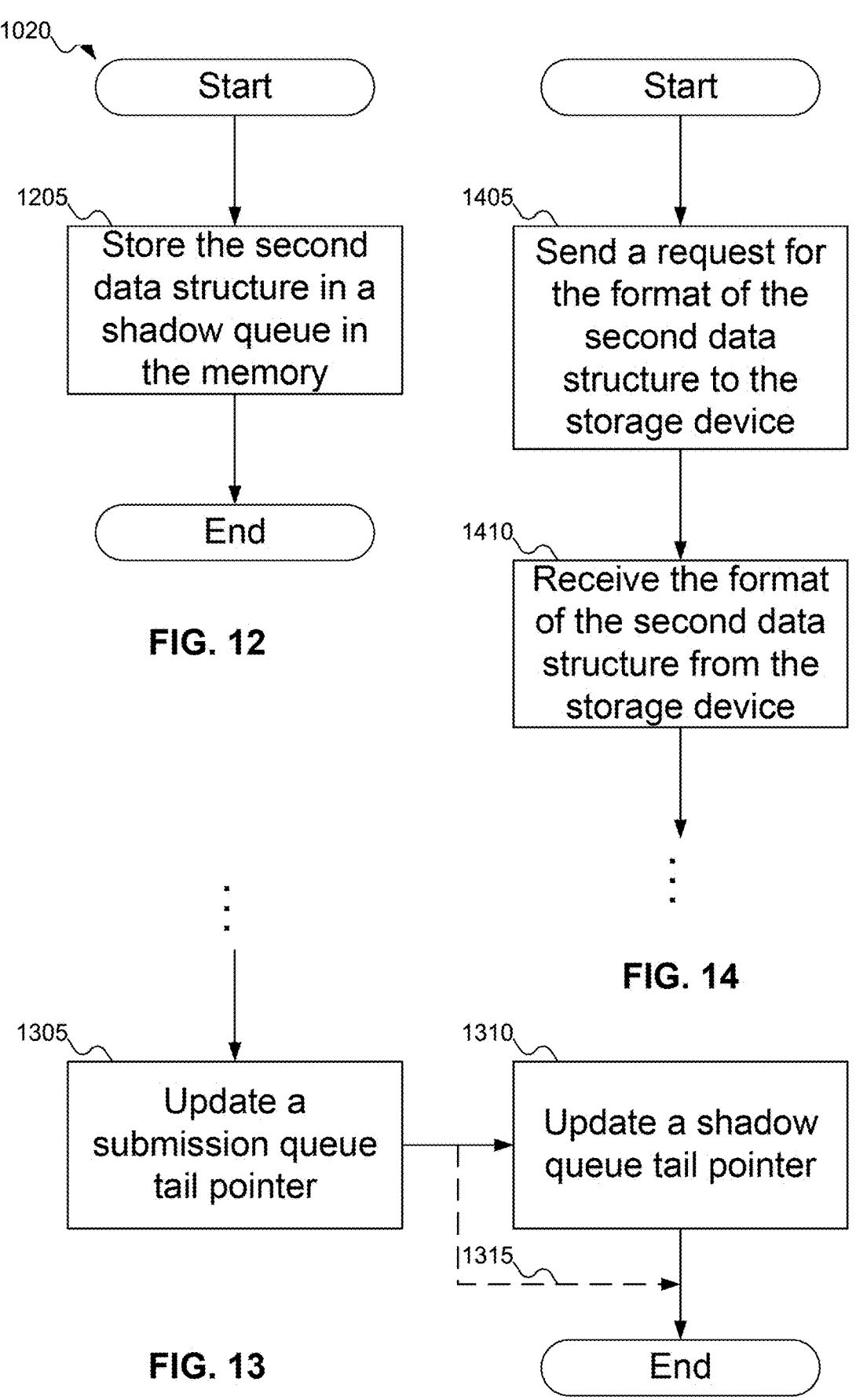
FIG. 12 shows a flowchart of an example procedure for the processor of FIG. 1 to store the shadow queue entry of FIGS. 7A-7B in the shadow queues of FIGS. 7A-7B, according to embodiments of the disclosure.
FIG. 13 shows a flowchart of an example procedure for the processor of FIG. 1 to inform the storage device of FIG. 1 that the submission queue entry of FIG. 4 is present in the submission queue of FIG. 4, according to embodiments of the disclosure.
FIG. 14 shows a flowchart of an example procedure for the processor of FIG. 1 to request and receive information about the structure of the shadow queue entry of FIGS. 7A-7B expected by the storage device of FIG. 1, according to embodiments of the disclosure.

FIG. 12 shows a flowchart of an example procedure for processor 110 of FIG. 1 to store shadow queue entry 710 of FIGS. 7A-7B in shadow queue 705 and/or 715 of FIGS. 7A-7B, according to embodiments of the disclosure. In FIG. 12, at block 1205, processor 110 of FIG. 1 may store shadow queue entry 710 of FIGS. 7A-7B in shadow queue 705 and/or 715 of FIGS. 7A-7B.

FIG. 13 shows a flowchart of an example procedure for processor 110 of FIG. 1 to inform storage device 120 of FIG. 1 that submission queue entry 405 of FIG. 4 and shadow queue entry 710 of FIGS. 7A-7B are present in submission queue 405 of FIG. 4 and shadow queue 705 and/or 715 of FIGS. 7A-7B, according to embodiments of the disclosure. In FIG. 13, at block 1305, processor 110 of FIG. 1 may update submission queue tail pointer 415 of FIG. 4 to reflect that SQE 405 of FIG. 4 has been added to submission queue 410 of FIG. 4. At block 1310, processor 110 of FIG. 1 may also update a shadow queue tail pointer to reflect that shadow queue entry 710 of FIGS. 7A-7B has been added to shadow queue 705 and/or 715 of FIGS. 7A-7B. Block 1310 may be omitted, as shown by dashed line 1315: for example, if sparse shadow queue 705 of FIG. 7A is used and shadow queue entry 710 of FIG. 7A is placed in the same position in shadow queue 705 of FIG. 7A as SQE 405 of FIG. 4 is placed in submission queue 410 of FIG. 4. Alternatively, processor 110 of FIG. 1 may notify storage device 120 of FIG. 1 that SQE 405 of FIG. 4 and/or shadow queue entry 710 of FIG. 7 have been added to submission queue 410 of FIG. 4 and/or shadow queue 715 of FIG. 7 by ringing one (or more) doorbells (whether or not submission queue tail pointer 415 of FIG. 4 was updated). FIG. 14 shows a flowchart of an example procedure for processor 110 of FIG.

1 to request and receive information about the structure of shadow queue entry 710 of FIGS. 7A-7B expected by storage device 120 of FIG. 1, according to embodiments of the disclosure. In FIG. 14, at block 1405, processor 110 of FIG. 1 may send request 905 of FIG. 9 to storage device 120 of FIG. 1. At block 1410, processor 110 of FIG. 1 may receive log page 910 of FIG. 9 (or any other data structure that may include the requested information) from storage device 120 of FIG. 1.

Figure 15:
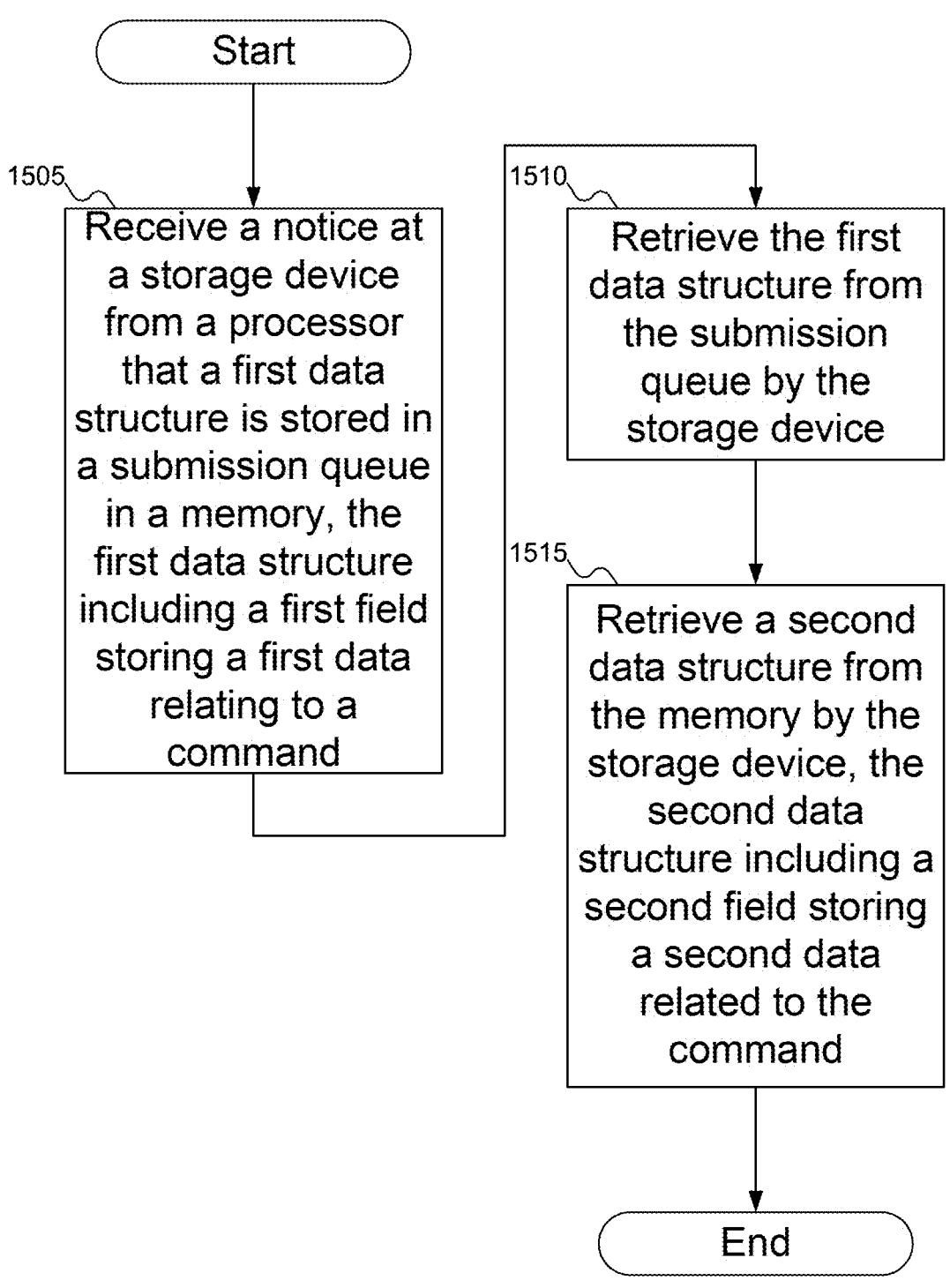
FIG. 15 shows a flowchart of an example procedure for the storage device of FIG. 1 to retrieve the submission queue entry of FIG. 4 and the shadow queue entry of FIGS. 7A-7B for additional command data, according to embodiments of the disclosure.

FIG. 15 shows a flowchart of an example procedure for storage device 120 of FIG. 1 to retrieve submission queue entry 405 of FIG. 4 and shadow queue entry 710 of FIGS. 7A-7B, according to embodiments of the disclosure. In FIG. 15, at block 1505, storage device 120 of FIG. 1 may receive a notification from processor 110 of FIG. 1 that SQE 405 of FIG. 4 has been added to submission queue 410 of FIG. 4. This notification may be through processor 110 of FIG. 1 updating submission queue tail pointer 415 of FIG. 4, or through processor 110 of FIG. 1 ringing a doorbell. Note that this notification is merely an alert, and does not necessarily provide any information about what data is present in SQE 405 of FIG. 4 (or other data structures, such as shadow queue entry 710 of FIGS. 7A-7B). At block 1510, storage device 120 of FIG. 1 may retrieve SQE 405 of FIG. 4 from submission queue 410 of FIG. 4 in memory 115 of FIG. 1. Finally, at block 1515, storage device 120 of FIG. 1 may retrieve shadow queue entry 710 of FIGS. 7A-7B from shadow queue 705 and/or 715 of FIGS. 7A-7B.

FIG. 16 shows a flowchart of an example procedure for storage device 120 of FIG. 1 to retrieve shadow queue entry 710 of FIGS. 7A-7B in shadow queue 705 and/or 715 of FIGS. 7A-7B, according to embodiments of the disclosure. In FIG. 16, at block 1605, storage device 120 of FIG. 1 may retrieve shadow queue entry 710 of FIGS. 7A-7B from shadow queue 705 and/or 715 of FIGS. 7A-7B.

FIG. 17 shows a flowchart of an example procedure for storage device 120 of FIG. 1 to receive a request for and return information about the structure of shadow queue entry 710 of FIGS. 7A-7B expected by processor 110 of FIG. 1, according to embodiments of the disclosure. In FIG. 17, at block 1705, storage device 120 of FIG. 1 may receive request 905 of FIG. 9 from processor 110 of FIG. 1. At block 1710, storage device 120 of FIG. 1 may send log page 910 of FIG. 9 (or any other data structure that may include the requested information) to processor 110 of FIG. 1.

Figure 18:
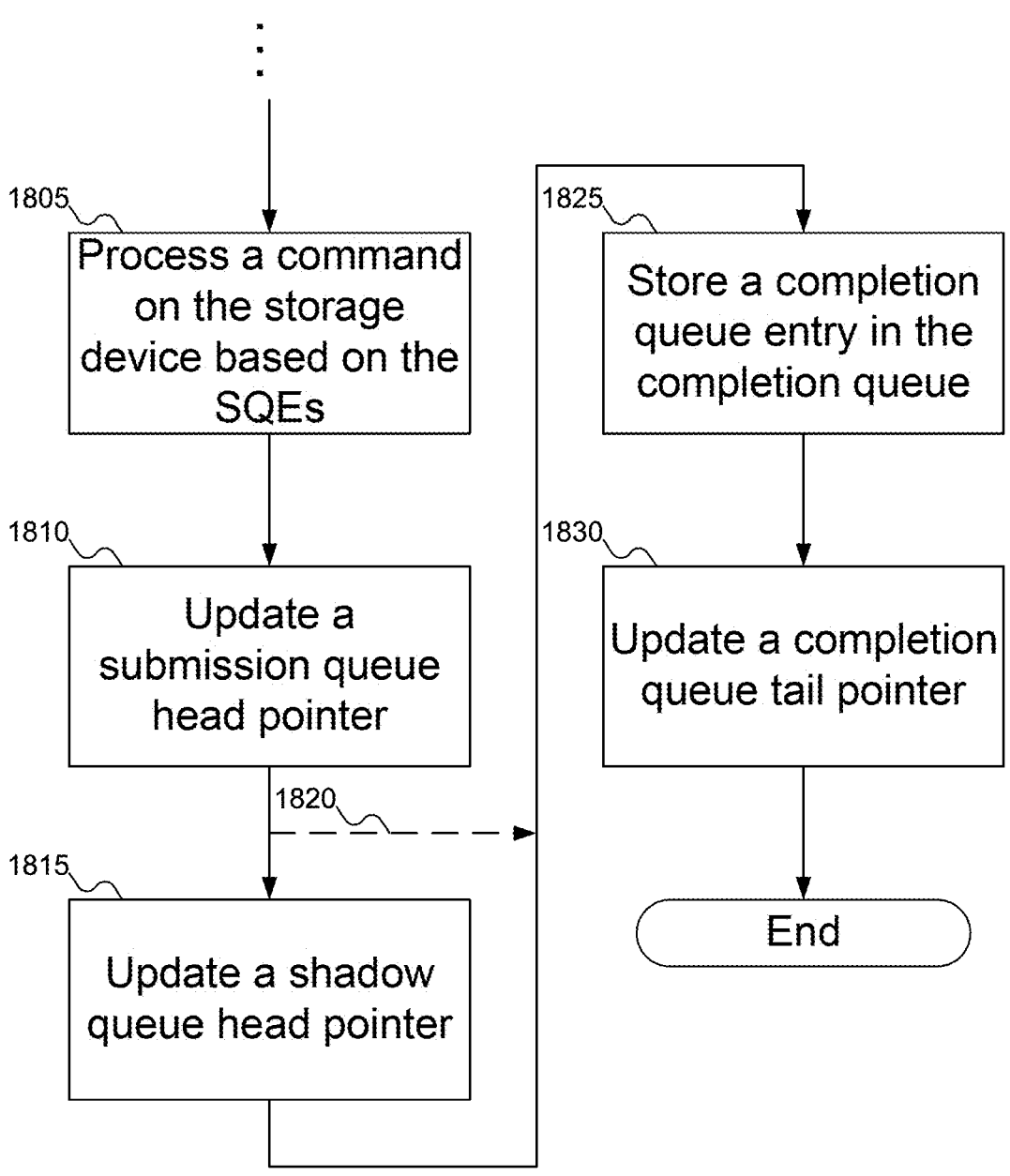
FIG. 18 shows a flowchart of an example procedure for the storage device of FIG. 1 to execute a command based on the submission queue entry of FIG. 4 and the shadow queue entry of FIGS. 7A-7B, according to embodiments of the disclosure.

FIG. 18 shows a flowchart of an example procedure for storage device 120 of FIG. 1 to execute a command based on submission queue entry 405 of FIG. 4 and return a result to processor 110 of FIG. 1, according to embodiments of the disclosure. In FIG. 18, at block 1805, storage device 120 of FIG. 1 may process a command based on submission queue 405 of FIG. 4. Storage device 120 of FIG. 1 may also execute the command using data relating to the command from shadow queue entry 710 of FIGS. 7A-7B. At block 1810, storage device 120 of FIG. 1 may update submission queue head pointer 610 of FIG. 6 to reflect that SQE 405 of FIG. 4 has been retrieved from submission queue 410 of FIG. 4. At block 1815, storage device 120 of FIG. 1 may also update a shadow queue head pointer to reflect that shadow queue entry 710 of FIGS. 7A-7B has been removed from shadow queue 705 and/or 715 of FIGS. 7A-7B. Block 1815 may be omitted, as shown by dashed line 1820: for example, if sparse shadow queue 705 of FIG. 7A is used and shadow queue entry 710 of FIG. 7A is placed in the same position in shadow queue 705 of FIG. 7A as SQE 405 of FIG. 4 is placed in submission queue 410 of FIG. 4. At block 1825, storage device 120 of FIG. 1 may store a completion queue entry in completion queue 420 of FIG. 4. Finally, at block 1830, storage device 120 of FIG. 1 may update a completion queue tail pointer to reflect that the completion queue entry has been added to completion queue 420 of FIG. 4.

Figure 19:
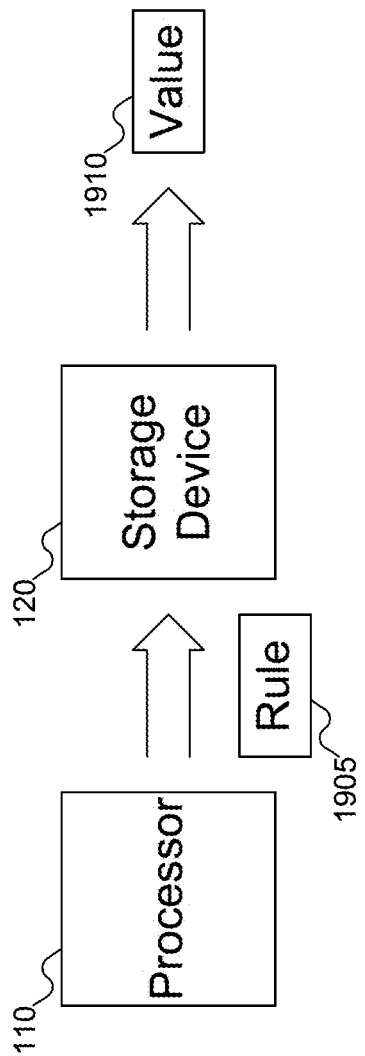
FIG. 19 shows the processor of FIG. 1 providing a rule to the storage device of FIG. 1 regarding what value(s) should be assigned to field(s) in the submission queue entry of FIG. 4, according to embodiments of the disclosure.

While some embodiments of the disclosure may use shadow queues 705 and/or 715 of FIGS. 7A-7B to store additional data, other embodiments of the disclosure may use other ways in which additional data may be added to SQE 405 of FIG. 4. For example, it might happen that processor 110 of FIG. 1 uses rules that are deterministic and predictable to determine the values for fields in SQE 405 of FIG. 4. If processor 110 of FIG. 1 uses rules to determine the values for fields in SQE 405 of FIG. 4, then those fields could be repurposed to store other data, and storage device 120 might determine the values that processor 110 of FIG. 1 might otherwise have used for those fields. For example, processor 110 of FIG. 1 might establish rules that certain fields in SQE 405 of FIG. 4 are never set, while other fields in SQE 405 of FIG. 4 are always set. For example, one rule might be that Limited Retry 520 of FIG. 5 is never set (the value is always 0); another rule might be that Self-test Code 530 of FIG. 5 is always set (the value is always 1). Processor 110 of FIG. 1 may establish any number of such rules that storage device 120 of FIG. 1 may use to determine values for these fields without processor 110 of FIG. 1 having to set those values in the fields in SQE 405 of FIG. 4. Since processor 110 of FIG. 1 would then not need to store those values in those fields in SQE 405, those fields may be repurposed to store other data, thereby effectively increasing the amount of data that may be provided to storage device 120 of FIG. 1 via SQE 405 of FIG. 4. FIG. 19 demonstrates how such rules may be used. As a result, the value in these fields may be considered independent of the fields themselves (in this context, "independent" is intended to mean that the values stored in the fields do not represent the values storage device 120 of FIG. 1 should actually use for those fields, but instead represent other data relating to the command).

FIG. 19 shows processor 110 of FIG. 1 providing a rule to storage device 120 of FIG. 1 regarding what value(s) should be assigned to field(s) in submission queue entry 405 of FIG. 4, according to embodiments of the disclosure. In FIG. 19, processor 110 may send rule 1905 to storage device 120. Storage device 120 may then use rule 1905 to determine for itself values 1910 to be used for one or more fields in SQE 405 of FIG. 4.

Rule 1905 may take any desired form. Rule 1905 might specify that a particular field is to be set to a particular value 1910. As discussed above, rule 1905 might be that Limited Retry 520 of FIG. 5 is never set, or that Self-test Code 530 of FIG. 5 is always set. Or rule 1905 might establish a formula that storage device 120 may use to calculate value 1910, where the formula may depend on information that is otherwise available to storage device 120. For example, metadata pointer 535 of FIG. 5 might be calculated to be a predetermined offset from the address of PRP Entry 1/SGL Part 1 540 of FIG. 5. Alternatively, the offset to be used might be stored in some predetermined address in memory 115 of FIG. 3 (or memory 340 of FIG. 3), or in a predetermined register, or in a log page. Or, rule 1905 might use another value found in SQE 405 of FIG. 4 in the calculation. For example, Logical Block Storage Tag/Initial Logical Block Storage Tag 545 of FIG. 5 might store a value in only part of that field (such as the first 16 bits of double word 14), and rule 1905 might define how to calculate the remaining bits of the value. Or, rule 1905 might specify that only a subset of the bits in the field are to be used for the value for that field, and all other bits may be repurposed. For example, processor 110 might limit namespace ID 550 of FIG. 5 to only 4 bits for value 1910, leaving 28 bits available for other purposes.

In some embodiments of the disclosure, every SQE 405 of FIG. 4 may have these rules applied. In such embodiments of the disclosure, storage device 120 of FIG. 1 may know to apply the rules as specified by processor 110 of FIG. 1 automatically. But in other embodiments of the disclosure, processor 110 might need to establish SQE 405 of FIG. 4 without being limited by rule 1905. In such embodiments of the disclosure, processor 110 may need a mechanism to inform storage device 120 of FIG. 1 which SQEs 405 of FIG. 4 are covered by the rules and which are not.

In some embodiments the disclosure, an unused bit, such as bit 10 of double word 0, may be used to indicate that rule 1905 is to be applied. In other embodiments of the disclosure, a new opcode 510 of FIG. 5 may be defined. For example, a command to write data to storage device 120 might have a particular opcode 510 of FIG. 5: a variant of this opcode, that is a second (new) opcode, might be defined to identify a write command for which rule 1905 is to be applied. Then, by default, the existing opcode 510 of FIG. 5 may continue to represent a command without applying rule 1905 (this provides for backward compatibility, as processor 110 may specify all values for all fields rather than relying on rule 1905 when the original opcode 510 of FIG. 5 is used). So, a "WRITE" command may indicate that rule 1905 is not to be used, whereas a "WRITE2" command may indicate that rule 1905 is to be used.

While FIG. 19 shows one rule 1905, embodiments of the disclosure may include any number of rules 1905 that processor 110 may provide to storage device 120. Alternatively, multiple rules 1905 may be combined into a single rule 1905 governing how to determine values 1910 for multiple fields.

As the values in certain fields in SQE 405 of FIG. 4 might now be independent of the fields themselves, processor 110 and storage device 120 may agree on how those values should be interpreted. This interpretation may be specified as part of (or associated with) rule 1905, so that storage device 120 may know what those values are intended to represent and how storage device 120 may use those values.

The above discussion describes embodiments of the disclosure to support additional data being used with a submission queue entry. Other embodiments of the disclosure may also be applicable to completion queue entries stored in completion queues, or in other queues containing entries of fixed size. Such embodiments of the disclosure may operate similarly to how submission queue entries may support additional data. All such embodiments are considered part of this disclosure.

Figure 20:
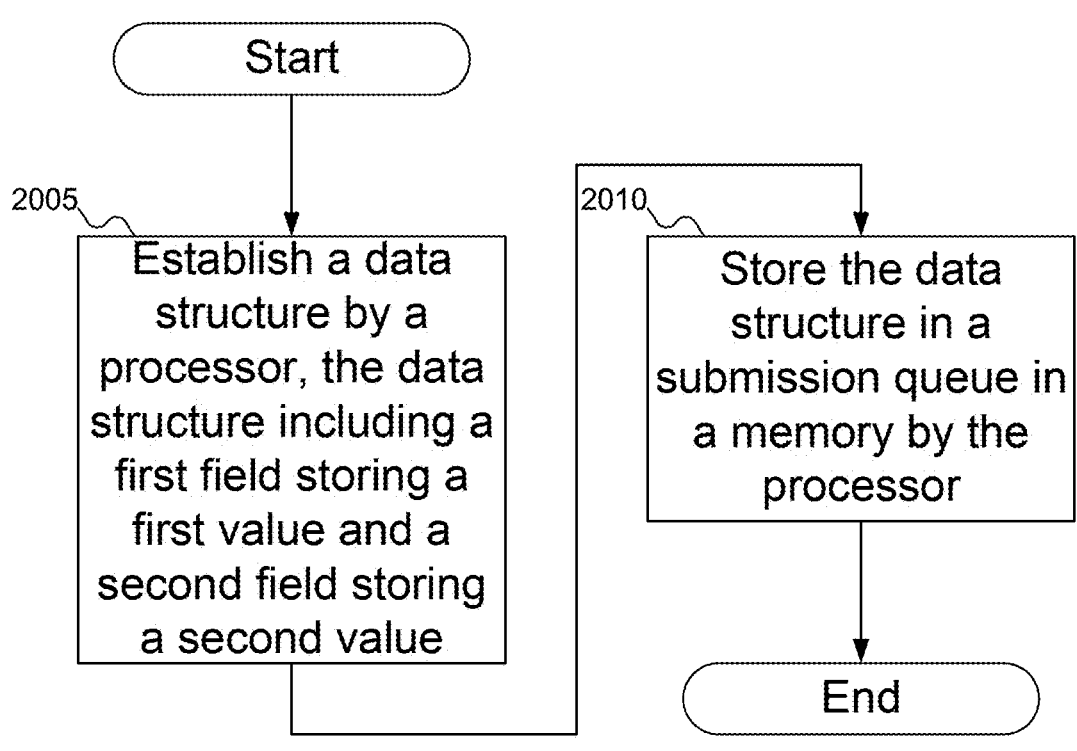
FIG. 20 shows a flowchart of an example procedure for the processor of FIG. 1 to establish the submission queue entry of FIG. 4, according to embodiments of the disclosure.

FIG. 20 shows a flowchart of an example procedure for processor 110 of FIG. 1 to establish submission queue entry 405 of FIG. 4, according to embodiments of the disclosure. In FIG. 20, at block 2005, processor 110 of FIG. 1 may establish SQE 405 of FIG. 4. SQE 405 of FIG. 4 may include two fields, each storing a value. The value in the first field may indicate that the value in the second field is independent of the second field. At block 2010, processor 110 of FIG. 1 may store SQE 405 of FIG. 4 in submission queue 410 of FIG. 4 in memory 115 of FIG. 1.

FIG. 21 shows a flowchart of an example procedure for processor 110 of FIG. 1 to provide rule 1905 of FIG. 19 to storage device 120 of FIG. 1 regarding how to assign value(s) to field(s) in submission queue entry 405 of FIG. 4, according to embodiments of the disclosure. In FIG. 21, at block 2105, processor 110 of FIG. 1 may determine rule 1905 of FIG. 19 governing how value 1910 of FIG. 19 may be determined for a particular field (or how multiple values 1910 of FIG. 19 may be determined for multiple fields). At block 2110, processor 110 of FIG. 1 may inform storage device 120 of FIG. 1 about rule 1905 of FIG. 19.

FIG. 22 shows a flowchart for processor 110 of FIG. 1 to define a variant opcode to indicate when rule 1905 of FIG. 19 should be used by storage device 120 of FIG. 1, according to embodiments of the disclosure. In FIG. 22, at block 2205, processor 110 of FIG. 1 may define opcode 510 of FIG. 5 as a variant of another opcode 510 of FIG. 5. The original opcode 510 of FIG. 5 may be defined by a specification, such as the NVMe specification. The new opcode may be used when rule 1905 of FIG. 19 is to be applied to determine value 1910 of FIG. 1 for a field in SQE 405 of FIG. 4. At block 2210, processor 110 of FIG. 1 may inform storage device 120 of FIG. 1 of the variant opcode 510 of FIG. 5.

While FIG. 22 describes processor 110 of FIG. 1 as defining the variant opcode and informing storage device 120 of FIG. 1 of the new opcode, embodiments of the disclosure may reverse the roles. That is, storage device 120 of FIG. 1 might define the new opcode, and inform processor 110 of FIG. 1 to use the new opcode when rule 1905 of FIG. 19 is to be applied to determine value 1910 of FIG. 1 for a field in SQE 405 of FIG. 4.

Figure 23:
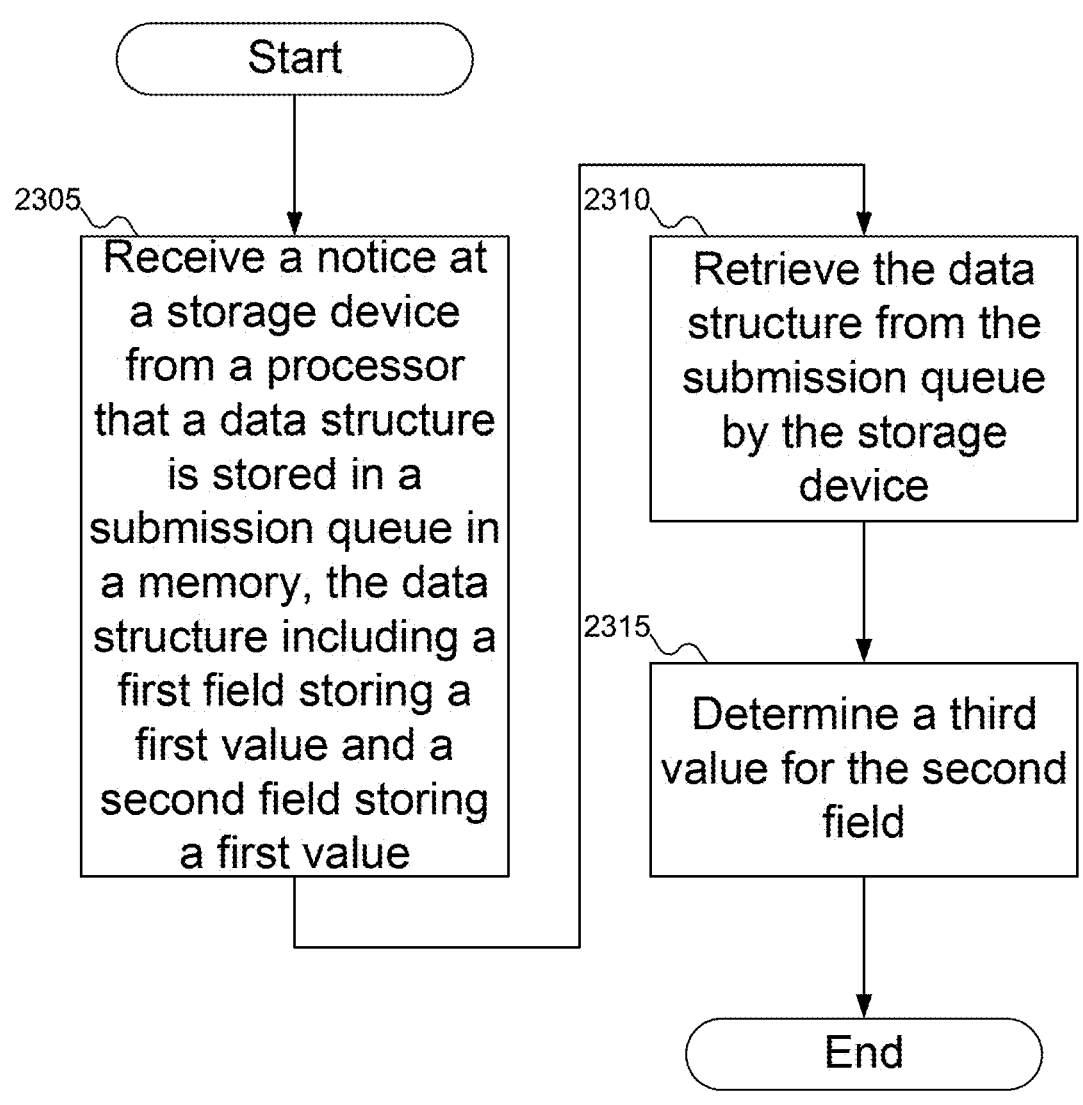
FIG. 23 shows a flowchart of an example procedure for the storage device of FIG. 1 to retrieve the submission queue entry of FIG. 4, according to embodiments of the disclosure.

FIG. 23 shows a flowchart of an example procedure for storage device 120 of FIG. 1 to retrieve submission queue entry 405 of FIG. 4, according to embodiments of the disclosure. In FIG. 23, at block 2305, storage device 120 of FIG. 1 may receive a notification from processor 110 of FIG. 1 that SQE 405 of FIG. 4 has been added to submission queue 410 of FIG. 4. Note that this notification is merely an alert, and does not necessarily provide any information about what data is present in SQE 405 of FIG. 4 (or other data structures, such as shadow queue entry 710 of FIGS. 7A-7B). At block 2310, storage device 120 of FIG. 1 may retrieve SQE 405 of FIG. 4 from submission queue 410 of FIG. 4 in memory 115 of FIG. 1. Finally, at block 2315, storage device 120 of FIG. 1 may determine value 1910 of FIG. 19 for a field in SQE 405 of FIG. 4.

FIG. 24 shows a flowchart of an example procedure for storage device 120 of FIG. 1 to apply rule 1905 of FIG. 19 to field(s) in submission queue entry 405 of FIG. 4, according to embodiments of the disclosure. In FIG. 24, at block 2405, storage device 120 of FIG. 1 may receive rule 1905 of FIG. 19 from processor 110 of FIG. 1. Later, at block 2410, storage device 120 of FIG. 1 may apply rule 1905 of FIG. 19 to determine value 1910 of FIG. 19 for a field in SQE 405 of FIG. 4 (and in particular for a field storing a value that is independent of the field).

FIG. 25 shows a flowchart of an example procedure for storage device 120 of FIG. 1 to apply rule 1905 of FIG. 19 to field(s) in submission queue entry 405 of FIG. 4 using another field in submission queue entry 405 of FIG. 4, according to embodiments of the disclosure. In FIG. 25, at block 2505, storage device 120 of FIG. 1 may apply rule 1905 of FIG. 19 using another value, which might be found in, among other possibilities, another field in SQE 405 or an external location, such as a memory address in memory 115 of FIG. 1, a register, or a log page.

Figure 26:
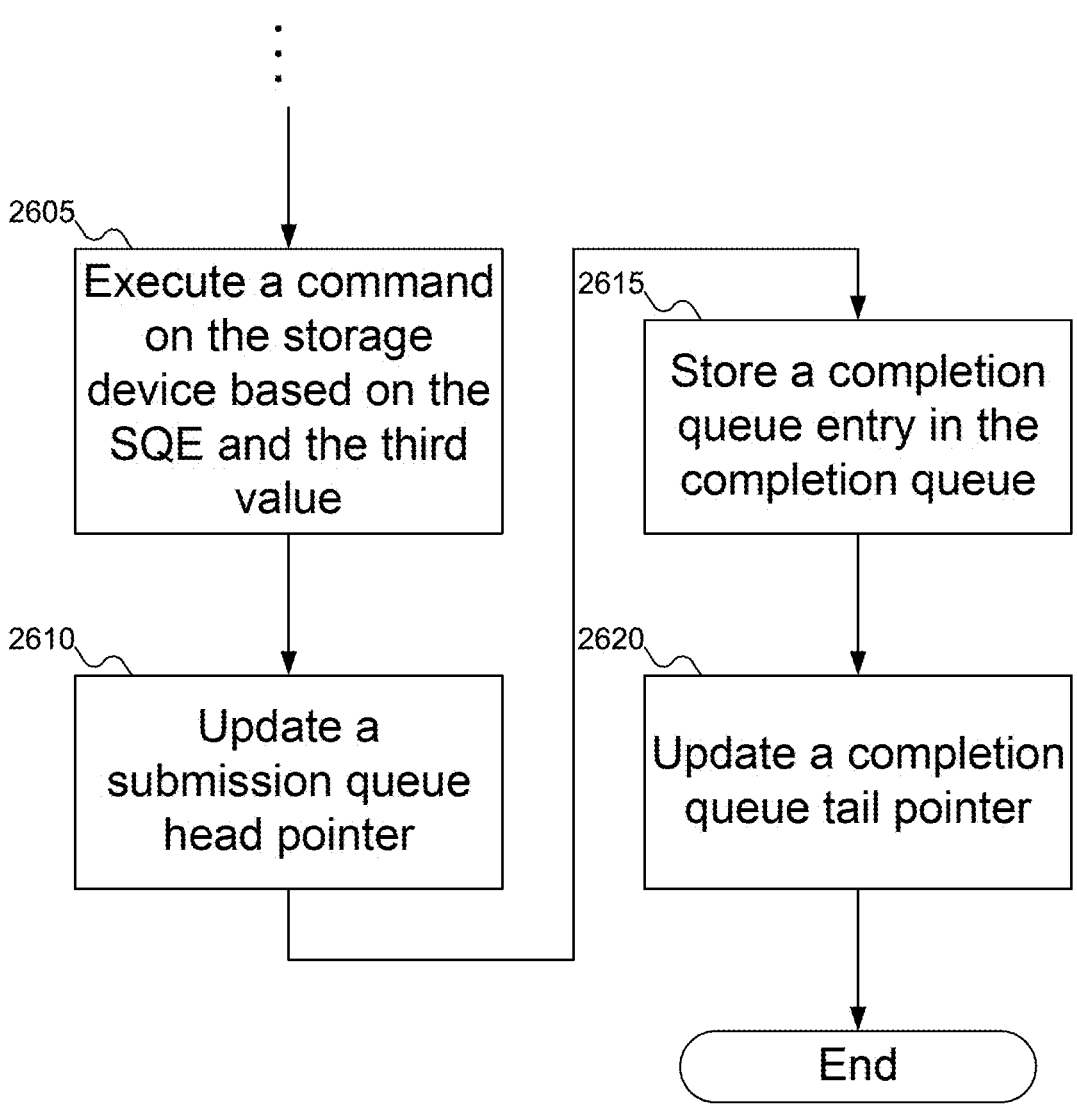
FIG. 26 shows a flowchart of an example procedure for the storage device of FIG. 1 to execute a command based on the submission queue entry of FIG. 4 and return a result to the processor of FIG. 1, according to embodiments of the disclosure.

FIG. 26 shows a flowchart of an example procedure for storage device 120 of FIG. 1 to execute a command based on submission queue entry 405 of FIG. 4 and return a result to processor 110 of FIG. 1, according to embodiments of the disclosure. In FIG. 26, at block 2605, storage device 120 of FIG. 1 may execute a command based on submission queue 405 of FIG. 4. Storage device 120 of FIG. 1 may also execute the command using value 1910 of FIG. 19, which may be determined using rule 1905 of FIG. 19 for a field in SQE 405 that stores independent data. At block 2610, storage device 120 of FIG. 1 may update submission queue head pointer 610 of FIG. 6 to reflect that SQE 405 of FIG. 4 has been retrieved from submission queue 410 of FIG. 4. At block 2615, storage device 120 of FIG. 1 may store a completion queue entry in completion queue 420 of FIG. 4. Finally, at block 2620, storage device 120 of FIG. 1 may update a completion queue tail pointer to reflect that the completion queue entry has been added to completion queue 420 of FIG. 4.

It is also possible to combine different embodiments of the disclosure. For example, processor 110 of FIG. 1 might use shadow queue 705 and/or 715 of FIGS. 7A-7B to store additional data relating to the command, while also using repurposing fields in SQE 405 of FIG. 4 that may be determined using rules.

In FIGS. 10-18 and 20-26, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Some embodiments of the disclosure may include a submission queue and a shadow queue. The shadow queue may store entries including additional data for a command for which there might not be room in a corresponding submission queue entry. Embodiments of the disclosure offer a technical advantage by providing a mechanism to provide additional data relating to a command with minimal changes to the submission queue entry (the changes might be as minimal as just including a flag that there is a shadow queue entry, and potentially not even that if the storage device may determine if a shadow queue entry exists and may retrieve the shadow queue entry without any additional information).

Some embodiments of the disclosure may include a submission queue. The submission queue may store entries including data for a command. But one or more fields in the submission queue entry may be repurposed and may store data that is independent of the field storing the data. The storage device may then determine what value is appropriate for the original purpose of that field, which may be determined based a rule provided by the processor. Embodiments of the disclosure offer a technical advantage by providing a mechanism to provide additional data relating to a command by repurposing fields in the submission queue entry that the storage device may calculate for itself, thereby increasing the amount of data provided without increasing the size of the submission queue entry.

Systems, methods, and apparatus in accordance with example embodiments of the disclosure may involve hosts, solid state storage devices (SSD), and SSD controllers which use one or more methods of managing Submission Queue Entries (SQE). Embodiments of the disclosure may enable continued expansion of Nonvolatile Memory Express (NVMe) SQEs while not expanding the use of 64 byte SQEs.

In some embodiments of the disclosure, the methods and apparatuses may follow some or all of the following actions:
1. The host may write SQ Entry into a memory location, for example, DRAM.

2. The host may write the SQ Tail Doorbell update to the device.
3. The device may read the SQ Entry.
4. The command may execute.
5. The device may write the Completion Queue (CQ) Entry.
6. The device controller may generate one or more Interrupts and send them to the host.
7. The host may read the CQ Entry.
8. The host may write the CQ Head Doorbell (DB) update to the device.

SQEs in their present state, are running low or out of space. Overflowing of the 64 bytes in the SQE may cause many issues in compatibility, speed and processing capabilities of current and future systems.

Embodiments of the disclosure may repurpose bits that are not presently assigned a purpose for communicating information about the write command. Embodiments of the disclosure exemplary of the write command should not be deemed limiting and one in the art would appreciate that any type of SQE would be applicable and conceptualized (for example, write commands, flush, compare, verify, copy, reservation register, etc.). For example, in the NVMe specification 2.0c, 33 bits are not currently in use. Some commands may have more bits available.

The "I/O Submission Queue Entry Size" field in "Controller Configuration" (CCJOSQES) and SQES field in Identify Controller enable powers of two increases. Therefore, hosts and SSDs both use hardware accelerations around 64 bytes. Reassignment of unused bits, or double usage of bits, extends the usefulness of 64 byte SQEs by expanding backwards compatibility, saving system resources, and increasing efficiency in future systems. In one example, bit 10 may be used to indicate a normal write command that uses a second definition of Write SQE where the LBST, LBAT, and LBATM fields all contain a secondary meaning.

Any of the storage devices disclosed herein may communicate through any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), User Datagram Protocol (UDP), remote direct memory access (RDMA), RDMA over Converged Ethernet (ROCE), FibreChannel, InfiniB and, Serial ATA (SATA), Small Computer Systems Interface (SCSI), Serial Attached SCSI (SAS), iWARP, Hypertext Transfer Protocol (HTTP), and/or the like, or any combination thereof.

Any of the functionality disclosed herein may be implemented with hardware, software, or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In the embodiments of the disclosure described herein, the operations are example operations, and may involve various additional operations not explicitly illustrated. In some embodiments of the disclosure, some of the illustrated operations may be omitted. In some embodiments of the disclosure, one or more of the operations may be performed by components other than those illustrated herein. Additionally, in some embodiments of the disclosure, the temporal order of the operations may be varied. Moreover, the figures are not necessarily drawn to scale.

Table of Acronyms

PRP Physical Region Page

STC Self-test Code

SGL Scatter Gather List

FUA Force Unit Access

LBST Logical Block Storage Tag

DSM Dataset Management

ILBRT Initial Logical Block Reference Tag

DSPEC Directive Specific

LBA Logical Block Address

LBAT Logical Block Application Tag

LBATM Logical Block Application Tag Mask

LR Limited Retry

Some embodiments of the disclosure may use a shadow submission queue. The shadow may be a densely packed and/or a mirror SQ (a sparse shadow queue). In one example, bit 10 may be used to tell drive to go use the shadow SQ, for example.

In some embodiments of the disclosure, a sparsely populated Mirror SQ may be created. The drive may look at the same SQ offset to find the secondary SQE structure. No added doorbell and queue handling may be needed. Additional space may be used.

In other embodiments of the disclosure, one or more densely populated SQs may be used. The SQs may move with new insertions. Identifiers may be included. For example, the 1st SQE's CMD ID, pointing back to initiating SQE for debug checks, may be included. Exemplary implementation choices include:

Added SQ doorbell handling for head and/or tail and independent multithreaded operation.

Implementation by Assumption. For example:

4 commands on SQ needed overflow information as marked in bit 10.

There may be 4 valid SQ overflow entries present in the 2nd SQ.

In some embodiments of the disclosure, the size of the SQ overflow entries may be different from 64 bytes.

In other embodiments of the disclosure, one or more new OpCode(s) for Writes may be added. The host may identify some fields that may follow programmatic preferences. Some examples include:

Not setting FUA, LR, and/or DSM.

Setting SGL, and/or STC.

A metadata Pointer may be an offset from PRP Entry 1.

LB ST/ILBRT may be set equal to a formula that the Host provides. The Host may set some formula values in an NVMe log page or PCIe register. The Host may set some formula values or options in a reduced ILBRT field.

NSID may be limited by the Host to be 4 bits.

A new OpCode may use defaults, assumptions, and/or formulas.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR)

environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a memory, comprising:

a first data structure stored in the memory, the first data structure including a first field to store a first data relating to a command;

a second data structure stored in the memory, the second data structure including a second field to store a second data relating to the command;

a first queue stored in the memory, the first queue including the first data structure; and a second queue stored in the memory, the second queue including the second data structure, wherein a controller is configured to process the command based at least in part on the first data relating to the command and the second data relating to the command.

Statement 2. An embodiment of the disclosure includes the memory according to statement 1, wherein the first queue includes a submission queue or a completion queue.

Statement 3. An embodiment of the disclosure includes the memory according to statement 1, wherein the controller includes a storage controller of a storage device.

Statement 4. An embodiment of the disclosure includes the memory according to statement 1, wherein the first data structure includes a third field to store a third value identifying the presence of the second data structure in the second queue.

Statement 5. An embodiment of the disclosure includes the memory according to statement 4, wherein the third field includes a bit 10 of a double word 0.

Statement 6. An embodiment of the disclosure includes the memory according to statement 4, wherein the third field includes bits 8 and 9 of double word 0.

Statement 7. An embodiment of the disclosure includes the memory according to statement 6, wherein the third value is 11.

Statement 8. An embodiment of the disclosure includes the memory according to statement 1, wherein:

the first data structure includes a third field to store at least an operation code (opcode) or a command identifier; and the second data structure includes a fourth field including the opcode or the command identifier.

Statement 9. An embodiment of the disclosure includes the memory according to statement 1, wherein:

the first data structure includes a first size; and the second data structure includes a second size, wherein the second size is different from the first size.

Statement 10. An embodiment of the disclosure includes the memory according to statement 1, wherein:

the first queue includes a number of entries; and the second queue includes the number of entries.

Statement 11. An embodiment of the disclosure includes the memory according to statement 10, wherein:

the first data structure includes a position in the first queue; and the second data structure includes the position in the second queue.

Statement 12. An embodiment of the disclosure includes the memory according to statement 1, wherein:

the first queue includes a first number of entries; and the second queue includes a second number of entries, wherein the second number of entries is less than the first number of entries.

Statement 13. An embodiment of the disclosure includes the memory according to statement 12, wherein:

the first queue is configured to be emptied at a first rate; and the second queue is configured to be emptied at a second rate, wherein the second rate is different from the first rate.

Statement 14. An embodiment of the disclosure includes the memory according to statement 12, wherein the first data structure includes a third field to store an identifier of the second data structure.

Statement 15. An embodiment of the disclosure includes the memory according to statement 14, wherein the third field includes at least a bit in the first data structure.

Statement 16. An embodiment of the disclosure includes the memory according to statement 12, wherein:

the first queue includes a first ordering; and the second queue includes a second ordering, wherein the second ordering parallels the first ordering.

Statement 17. An embodiment of the disclosure includes the memory according to statement 12, wherein the second data structure includes a phase value.

Statement 18. An embodiment of the disclosure includes the memory according to statement 17, wherein the phase value includes a phase bit.

Statement 19. An embodiment of the disclosure includes a system, comprising:

a processor;

a storage device, the storage device connected to the processor; and a memory, the memory connected to the processor and the storage device, the memory including:

a first data structure stored in the memory, the first data structure including a first field to store a first data relating to a command;

a second data structure stored in the memory, the second data structure including a second field to store a second data relating to the command;

a first queue stored in the memory, the first queue including the first data structure; and a second queue stored in the memory, the second queue including the second data structure, wherein a controller is configured to process the command based at least in part on the first data relating to the command and the second data relating to the command.

Statement 20. An embodiment of the disclosure includes the system according to statement 19, wherein the first queue includes a submission queue or a completion queue.

Statement 21. An embodiment of the disclosure includes the system according to statement 19, wherein the controller includes a storage controller of the storage device.

Statement 22. An embodiment of the disclosure includes the system according to statement 19, wherein the first data structure includes a third field to store a third value identifying the presence of the second data structure in the second queue.

Statement 23. An embodiment of the disclosure includes the system according to statement 22, wherein the third field includes a bit 10 of a double word 0.

Statement 24. An embodiment of the disclosure includes the system according to statement 22, wherein the third field includes bits 8 and 9 of double word 0.

Statement 25. An embodiment of the disclosure includes the system according to statement 24, wherein the third value is 11.

Statement 26. An embodiment of the disclosure includes the system according to statement 19, wherein:

the first data structure includes a third field to store at least an operation code (opcode) or a command identifier; and the second data structure includes a fourth field including the opcode or the command identifier.

Statement 27. An embodiment of the disclosure includes the system according to statement 19, wherein:

the first data structure includes a first size; and the second data structure includes a second size, wherein the second size is different from the first size.

Statement 28. An embodiment of the disclosure includes the system according to statement 19, wherein:

the first queue includes a number of entries; and the second queue includes the number of entries.

Statement 29. An embodiment of the disclosure includes the system according to statement 28, wherein:

the first data structure includes a position in the first queue; and the second data structure includes the position in the second queue.

Statement 30. An embodiment of the disclosure includes the system according to statement 19, wherein:

the first queue includes a first number of entries; and the second queue includes a second number of entries, wherein the second number of entries is less than the first number of entries.

Statement 31. An embodiment of the disclosure includes the system according to statement 30, wherein the storage device includes:

a first doorbell for the first queue; and a second doorbell for the second queue.

Statement 32. An embodiment of the disclosure includes the system according to statement 30, wherein:

the first queue is configured to be emptied by the storage device at a first rate; and the second queue is configured to be emptied by the storage device at a second rate, wherein the second rate is different from the first rate.

Statement 33. An embodiment of the disclosure includes the system according to statement 30, wherein the first data structure includes a third field to store an identifier of the second data structure.

Statement 34. An embodiment of the disclosure includes the system according to statement 33, wherein the third field includes at least a bit in the first data structure.

Statement 35. An embodiment of the disclosure includes the system according to statement 30, wherein:

the first queue includes a first ordering; and the second queue includes a second ordering, wherein the second ordering parallels the first ordering.

Statement 36. An embodiment of the disclosure includes the system according to statement 30, wherein the second data structure includes a phase value.

Statement 37. An embodiment of the disclosure includes the system according to statement 36, wherein the phase value includes a phase bit.

Statement 38. An embodiment of the disclosure includes a method, comprising:

establishing a first data structure by a processor, the first data structure including a first field storing a first data relating to a command;

establishing a second data structure by the processor, the second data structure including a second field storing a second data related to the command;

storing the first data structure in a queue in a memory by the processor; and storing the second data structure in the memory by the processor.

Statement 39. An embodiment of the disclosure includes the method according to statement 38, wherein the queue includes a submission queue or a completion queue.

Statement 40. An embodiment of the disclosure includes the method according to statement 38, wherein a controller is configured to process the command based at least in part on the first data relating to the command and the second data relating to the command.

Statement 41. An embodiment of the disclosure includes the method according to statement 40, wherein the controller includes a storage controller of a storage device.

Statement 42. An embodiment of the disclosure includes the method according to statement 38, further comprising updating a queue tail pointer for the queue in a storage controller of a storage device.

Statement 43. An embodiment of the disclosure includes the method according to statement 38, wherein establishing the first data structure by the processor includes storing a value in in a third field in the first data structure to indicate the presence of the second data structure in the memory.

Statement 44. An embodiment of the disclosure includes the method according to statement 43, wherein the third field includes a bit 10 of a double word 0.

Statement 45. An embodiment of the disclosure includes the method according to statement 43, wherein the third field includes bits 8 and 9 of double word 0.

Statement 46. An embodiment of the disclosure includes the method according to statement 45, wherein the bits 8 and 9 of the double word 0 are 11.

Statement 47. An embodiment of the disclosure includes the method according to statement 38, wherein:

establishing the first data structure by the processor includes storing an operation code (opcode) or a command identifier in a third field in the first data structure; and establishing the second data structure by the processor includes storing the opcode or the command identifier in a fourth field in the second data structure.

Statement 48. An embodiment of the disclosure includes the method according to statement 38, wherein:

the first data structure includes a first size; and the second data structure includes a second size, wherein the second size is different from the first size.

Statement 49. An embodiment of the disclosure includes the method according to statement 38, wherein storing the second data structure in the memory by the processor includes storing the second data structure in a second queue in the memory by the processor.

Statement 50. An embodiment of the disclosure includes the method according to statement 49, wherein:

the queue includes a number of entries; and the second queue includes the number of entries.

Statement 51. An embodiment of the disclosure includes the method according to statement 50, wherein:

the first data structure includes a position in the queue; and the second data structure includes the position in the second queue.

Statement 52. An embodiment of the disclosure includes the method according to statement 49, wherein:

the queue includes a first number of entries; and the second queue includes a second number of entries, wherein the second number of entries is less than the first number of entries.

Statement 53. An embodiment of the disclosure includes the method according to statement 52, wherein:

the queue is configured to be emptied at a first rate; and the second queue is configured to be emptied at a second rate, wherein the second rate is different from the first rate.

Statement 54. An embodiment of the disclosure includes the method according to statement 52, wherein establishing a first data structure by a processor includes storing an identifier of the second data structure in a third field in the first data structure.

Statement 55. An embodiment of the disclosure includes the method according to statement 54, wherein the third field includes at least a bit in the first data structure.

Statement 56. An embodiment of the disclosure includes the method according to statement 52, wherein:

the queue includes a first ordering; and the second queue includes a second ordering, wherein the second ordering parallels the first ordering.

Statement 57. An embodiment of the disclosure includes the method according to statement 52, wherein the second data structure includes a phase value.

Statement 58. An embodiment of the disclosure includes the method according to statement 57, wherein the phase value includes a phase bit.

Statement 59. An embodiment of the disclosure includes the method according to statement 38, further comprising:

requesting a format for the second data structure from a storage device by the processor; and receiving the format for the second data structure from the storage device by the processor.

Statement 60. An embodiment of the disclosure includes a method, comprising:

receiving a notice at a storage device from a processor that a first data structure is stored in a queue in a memory, the first data structure including a first field storing a first data relating to a command;

retrieving the first data structure from the queue by the storage device; and retrieving a second data structure from the memory by the storage device, the second data structure including a second field storing a second data related to the command.

Statement 61. An embodiment of the disclosure includes the method according to statement 60, wherein the queue includes a submission queue or a completion queue.

Statement 62. An embodiment of the disclosure includes the method according to statement 60, further comprising processing a command on the storage device based at least in part on the first data relating to a command and the second data related to the command.

Statement 63. An embodiment of the disclosure includes the method according to statement 62, further comprising updating a queue head pointer for the queue in the memory.

Statement 64. An embodiment of the disclosure includes the method according to statement 60, wherein the first data structure includes a third field storing a value identifying the presence of the second data structure in the memory.

Statement 65. An embodiment of the disclosure includes the method according to statement 64, wherein the third field includes a bit 10 of a double word 0.

Statement 66. An embodiment of the disclosure includes the method according to statement 64, wherein the third field includes bits 8 and 9 of double word 0.

Statement 67. An embodiment of the disclosure includes the method according to statement 66, wherein the bits 8 and 9 of the double word 0 are 11.

Statement 68. An embodiment of the disclosure includes the method according to statement 60, wherein:

the first data structure further includes a third field storing at least an operation code (opcode) or a command identifier; and the second data structure includes a fourth field including the opcode or the command identifier.

Statement 69. An embodiment of the disclosure includes the method according to statement 60, wherein:

the first data structure includes a first size; and the second data structure includes a second size, wherein the second size is different from the first size.

Statement 70. An embodiment of the disclosure includes the method according to statement 60, wherein retrieving the second data structure from the memory by the storage device includes retrieving the second data structure from a second queue in the memory by the storage device.

Statement 71. An embodiment of the disclosure includes the method according to statement 70, wherein:

the queue includes a number of entries; and the second queue includes the number of entries.

Statement 72. An embodiment of the disclosure includes the method according to statement 71, wherein:

the first data structure includes a position in the queue; and the second data structure includes the position in the second queue.

Statement 73. An embodiment of the disclosure includes the method according to statement 70, wherein:

the queue includes a first number of entries; and the second queue includes a second number of entries, wherein the second number of entries is less than the first number of entries.

Statement 74. An embodiment of the disclosure includes the method according to statement 73, wherein:

retrieving the first data structure from the queue by the storage device includes retrieving a first number of first data structures from the queue by the storage device; and retrieving the second data structure from the second queue in the memory by the storage device includes retrieving a second number of second data structures from the second queue in the memory by the storage device, wherein the first number is different from the second number.

Statement 75. An embodiment of the disclosure includes the method according to statement 73, wherein the first data structure includes a third field storing an identifier of the second data structure.

Statement 76. An embodiment of the disclosure includes the method according to statement 75, wherein the third field includes at least a bit in the first data structure.

Statement 77. An embodiment of the disclosure includes the method according to statement 73, wherein:

the queue includes a first ordering; and the second queue includes a second ordering, wherein the second ordering parallels the first ordering.

Statement 78. An embodiment of the disclosure includes the method according to statement 73, wherein the second data structure includes a phase value.

Statement 79. An embodiment of the disclosure includes the method according to statement 78, wherein the phase value includes a phase bit.

Statement 80. An embodiment of the disclosure includes the method according to statement 79, wherein:

retrieving the second data structure from the second queue in the memory by the storage device includes retrieving the second data structure and a third data structure from the second queue in the memory by the storage device, the third data structure including a second phase bit; and the phase bit and the second phase bit have a common parity.

Statement 81. An embodiment of the disclosure includes the method according to statement 60, further comprising:

receiving a request for a format for the second data structure from the processor by the storage device; and sending the format for the second data structure to the processor from the storage device.

Statement 82. An embodiment of the disclosure includes an article, comprising a non-transitory storage medium, the non-transitory storage medium having stored thereon instructions that, when executed by a machine, result in:

establishing a first data structure by a processor, the first data structure including a first field storing a first data relating to a command;

establishing a second data structure by the processor, the second data structure including a second field storing a second data related to the command;

storing the first data structure in a queue in a memory by the processor; and storing the second data structure in the memory by the processor.

Statement 83. An embodiment of the disclosure includes the article according to statement 82, wherein the queue includes a submission queue or a completion queue.

Statement 84. An embodiment of the disclosure includes the article according to statement 82, wherein a controller is configured to process the command based at least in part on the first data relating to the command and the second data relating to the command.

Statement 85. An embodiment of the disclosure includes the article according to statement 84, wherein the controller includes a storage controller of a storage device.

Statement 86. An embodiment of the disclosure includes the article according to statement 82, the non-transitory storage medium having stored thereon further instructions that, when executed by the machine, result in updating a queue tail pointer for the queue in a storage controller of a storage device.

Statement 87. An embodiment of the disclosure includes the article according to statement 82, wherein establishing the first data structure by the processor includes storing a value in in a third field in the first data structure to indicate the presence of the second data structure in the memory.

Statement 88. An embodiment of the disclosure includes the article according to statement 87, wherein the third field includes a bit 10 of a double word 0.

Statement 89. An embodiment of the disclosure includes the article according to statement 87, wherein the third field includes bits 8 and 9 of double word 0.

Statement 90. An embodiment of the disclosure includes the article according to statement 89, wherein the bits 8 and 9 of the double word 0 are 11.

Statement 91. An embodiment of the disclosure includes the article according to statement 82, wherein:

establishing the first data structure by the processor includes storing an operation code (opcode) or a command identifier in a third field in the first data structure; and establishing the second data structure by the processor includes storing the opcode or the command identifier in a fourth field in the second data structure.

Statement 92. An embodiment of the disclosure includes the article according to statement 82, wherein:

the first data structure includes a first size; and the second data structure includes a second size, wherein the second size is different from the first size.

Statement 93. An embodiment of the disclosure includes the article according to statement 82, wherein storing the second data structure in the memory by the processor includes storing the second data structure in a second queue in the memory by the processor.

Statement 94. An embodiment of the disclosure includes the article according to statement 93, wherein:

the queue includes a number of entries; and the second queue includes the number of entries.

Statement 95. An embodiment of the disclosure includes the article according to statement 94, wherein:

the first data structure includes a position in the queue; and the second data structure includes the position in the second queue.

Statement 96. An embodiment of the disclosure includes the article according to statement 93, wherein:

the queue includes a first number of entries; and the second queue includes a second number of entries, wherein the second number of entries is less than the first number of entries.

Statement 97. An embodiment of the disclosure includes the article according to statement 96, wherein:

the queue is configured to be emptied at a first rate; and the second queue is configured to be emptied at a second rate, wherein the second rate is different from the first rate.

Statement 98. An embodiment of the disclosure includes the article according to statement 96, wherein establishing a first data structure by a processor includes storing an identifier of the second data structure in a third field in the first data structure.

Statement 99. An embodiment of the disclosure includes the article according to statement 98, wherein the third field includes at least a bit in the first data structure.

Statement 100. An embodiment of the disclosure includes the article according to statement 96, wherein:

the queue includes a first ordering; and the second queue includes a second ordering, wherein the second ordering parallels the first ordering.

Statement 101. An embodiment of the disclosure includes the article according to statement 96, wherein the second data structure includes a phase value.

Statement 102. An embodiment of the disclosure includes the article according to statement 101, wherein the phase value includes a phase bit.

Statement 103. An embodiment of the disclosure includes the article according to statement 82, the non-transitory storage medium having stored thereon further instructions that, when executed by the machine, result in:

requesting a format for the second data structure from a storage device by the processor; and receiving the format for the second data structure from the storage device by the processor.

Statement 104. An embodiment of the disclosure includes an article, comprising a non-transitory storage medium, the non-transitory storage medium having stored thereon instructions that, when executed by a machine, result in:

receiving a notice at a storage device from a processor that a first data structure is stored in a queue in a memory, the first data structure including a first field storing a first data relating to a command;

retrieving the first data structure from the queue by the storage device; and retrieving a second data structure from the memory by the storage device, the second data structure including a second field storing a second data related to the command.

Statement 105. An embodiment of the disclosure includes the article according to statement 104, wherein the queue includes a submission queue or a completion queue.

Statement 106. An embodiment of the disclosure includes the article according to statement 104, the non-transitory storage medium having stored thereon further instructions that, when executed by the machine, result in processing a command on the storage device based at least in part on the first data relating to a command and the second data related to the command.

Statement 107. An embodiment of the disclosure includes the article according to statement 106, the non-transitory storage medium having stored thereon further instructions that, when executed by the machine, result in updating a queue head pointer for the queue in the memory.

Statement 108. An embodiment of the disclosure includes the article according to statement 104, wherein the first data structure includes a third field storing a value identifying the presence of the second data structure in the memory.

Statement 109. An embodiment of the disclosure includes the article according to statement 108, wherein the third field includes a bit 10 of a double word 0.

Statement 110. An embodiment of the disclosure includes the article according to statement 108, wherein the third field includes bits 8 and 9 of double word 0.

Statement 111. An embodiment of the disclosure includes the article according to statement 110, wherein the bits 8 and 9 of the double word 0 are 11.

Statement 112. An embodiment of the disclosure includes the article according to statement 104, wherein:

the first data structure further includes a third field storing at least an operation code (opcode) or a command identifier; and the second data structure includes a fourth field including the opcode or the command identifier.

Statement 113. An embodiment of the disclosure includes the article according to statement 104, wherein:

the first data structure includes a first size; and the second data structure includes a second size, wherein the second size is different from the first size.

Statement 114. An embodiment of the disclosure includes the article according to statement 104, wherein retrieving the second data structure from the memory by the storage device includes retrieving the second data structure from a second queue in the memory by the storage device.

Statement 115. An embodiment of the disclosure includes the article according to statement 114, wherein:

the queue includes a number of entries; and the second queue includes the number of entries.

Statement 116. An embodiment of the disclosure includes the article according to statement 115, wherein:

the first data structure includes a position in the queue; and the second data structure includes the position in the second queue.

Statement 117. An embodiment of the disclosure includes the article according to statement 114, wherein:

the queue includes a first number of entries; and the second queue includes a second number of entries, wherein the second number of entries is less than the first number of entries.

Statement 118. An embodiment of the disclosure includes the article according to statement 117, wherein:

retrieving the first data structure from the queue by the storage device includes retrieving a first number of first data structures from the queue by the storage device; and retrieving the second data structure from the second queue in the memory by the storage device includes retrieving a second number of second data structures from the second queue in the memory by the storage device, wherein the first number is different from the second number.

Statement 119. An embodiment of the disclosure includes the article according to statement 117, wherein the first data structure includes a third field storing an identifier of the second data structure.

Statement 120. An embodiment of the disclosure includes the article according to statement 119, wherein the third field includes at least a bit in the first data structure.

Statement 121. An embodiment of the disclosure includes the article according to statement 117, wherein:

the queue includes a first ordering; and the second queue includes a second ordering, wherein the second ordering parallels the first ordering.

Statement 122. An embodiment of the disclosure includes the article according to statement 117, wherein the second data structure includes a phase value.

Statement 123. An embodiment of the disclosure includes the article according to statement 122, wherein the phase value includes a phase bit.

Statement 124. An embodiment of the disclosure includes the article according to statement 123, wherein:

retrieving the second data structure from the second queue in the memory by the storage device includes retrieving the second data structure and a third data structure from the second queue in the memory by the storage device, the third data structure including a second phase bit; and the phase bit and the second phase bit have a common parity.

Statement 125. An embodiment of the disclosure includes the article according to statement 104, the non-transitory storage medium having stored thereon further instructions that, when executed by the machine, result in:

receiving a request for a format for the second data structure from the processor by the storage device; and sending the format for the second data structure to the processor from the storage device.

Statement 126. An embodiment of the disclosure includes a memory, comprising:

a data structure stored in the memory, the data structure including:

a first field to store a first value; and a second field to store a second value; and a queue stored in the memory, the queue including the data structure, wherein the first value identifies that the second value is independent of the second field.

Statement 127. An embodiment of the disclosure includes the memory according to statement 126, wherein the queue includes a submission queue or a completion queue.

Statement 128. An embodiment of the disclosure includes the memory according to statement 126, wherein a processor associated with the memory specifies a rule for determining a third value for the second field.

Statement 129. An embodiment of the disclosure includes the memory according to statement 128, wherein the rule specifies that the third value is fixed.

Statement 130. An embodiment of the disclosure includes the memory according to statement 128, wherein the rule includes a formula for calculating the third value.

Statement 131. An embodiment of the disclosure includes the memory according to statement 130, wherein:

the data structure includes a third field to store a fourth value; and the formula calculates the third value based at least in part on the fourth value.

Statement 132. An embodiment of the disclosure includes the memory according to statement 128, wherein the rule identifies an external location for the third value.

Statement 133. An embodiment of the disclosure includes the memory according to statement 132, wherein the second location includes a memory address in the memory, a register, or a log page.

Statement 134. An embodiment of the disclosure includes the memory according to statement 126, wherein the first value includes an opcode.

Statement 135. An embodiment of the disclosure includes the memory according to statement 134, wherein the opcode is a variant of a second opcode.

Statement 136. An embodiment of the disclosure includes the memory according to statement 135, wherein the second opcode is defined according to a specification.

Statement 137. An embodiment of the disclosure includes the memory according to statement 136, wherein the specification includes a Non-Volatile Memory Express (NVMe) specification.

Statement 138. An embodiment of the disclosure includes the memory according to statement 126, wherein the first field includes a bit 10 of a double word 0.

Statement 139. An embodiment of the disclosure includes a system, comprising:

a processor;

a storage device, the storage device connected to the processor; and a memory, the memory connected to the processor and the storage device, the memory including:

a queue, the queue including a data structure, the data structure including:

a first field to store a first value; and a second field to store a second value; and wherein the opcode identifies that the second value is independent of the second field.

Statement 140. An embodiment of the disclosure includes the system according to statement 139, wherein the processor specifies a rule for determining a third value for the second field.

Statement 141. An embodiment of the disclosure includes the system according to statement 140, wherein the rule specifies that the third value is fixed.

Statement 142. An embodiment of the disclosure includes the system according to statement 140, wherein the rule includes a formula for calculating the third value.

Statement 143. An embodiment of the disclosure includes the system according to statement 142, wherein:

the data structure includes a third field to store a fourth value; and the formula calculates the third value based at least in part on the fourth value.

Statement 144. An embodiment of the disclosure includes the system according to statement 140, wherein the rule identifies an external location for the third value.

Statement 145. An embodiment of the disclosure includes the system according to statement 144, wherein the second location includes a memory address in the memory, a register, or a log page.

Statement 146. An embodiment of the disclosure includes the system according to statement 139, wherein the first value includes an opcode.

Statement 147. An embodiment of the disclosure includes the system according to statement 146, wherein the opcode is a variant of a second opcode.

Statement 148. An embodiment of the disclosure includes the system according to statement 147, wherein the second opcode is defined according to a specification.

Statement 149. An embodiment of the disclosure includes the system according to statement 148, wherein the specification includes a Non-Volatile Memory Express (NVMe) specification.

Statement 150. An embodiment of the disclosure includes the system according to statement 139, wherein the first field includes a bit 10 of a double word 0.

Statement 151. An embodiment of the disclosure includes a method, comprising:

establishing a data structure by a processor, the data structure including a first field storing a first value and a second field storing a second value; and storing the data structure in a queue in a memory by the processor;

wherein the first value identifies that the second value is independent of the second field.

Statement 152. An embodiment of the disclosure includes the method according to statement 151, wherein the queue includes a submission queue or a completion queue.

Statement 153. An embodiment of the disclosure includes the method according to statement 151, further comprising updating a queue tail pointer for the queue in a storage controller of the storage device.

Statement 154. An embodiment of the disclosure includes the method according to statement 151, further comprising specifying, by the processor, a rule for determining a third value for the second field.

Statement 155. An embodiment of the disclosure includes the method according to statement 154, wherein:

the method further comprises informing a storage device of the rule for determining the third value for the second field; and the storage device is configured to calculate the third value for the second field based at least in part on the rule.

Statement 156. An embodiment of the disclosure includes the method according to statement 154, wherein the rule specifies that the third value is fixed.

Statement 157. An embodiment of the disclosure includes the method according to statement 154, wherein the rule includes a formula for calculating the third value.

Statement 158. An embodiment of the disclosure includes the method according to statement 157, wherein:

the data structure includes a third field storing a fourth value; and the formula calculates the third value based at least in part on the fourth value.

Statement 159. An embodiment of the disclosure includes the method according to statement 154, wherein the rule identifies an external location for the third value.

Statement 160. An embodiment of the disclosure includes the method according to statement 159, wherein the second location includes a memory address in the memory, a register, or a log page.

Statement 161. An embodiment of the disclosure includes the method according to statement 151, wherein the first value includes an opcode.

Statement 162. An embodiment of the disclosure includes the method according to statement 161, further comprising defining the opcode as a variant of a second opcode.

Statement 163. An embodiment of the disclosure includes the method according to statement 162, wherein the second opcode is defined according to a specification.

Statement 164. An embodiment of the disclosure includes the method according to statement 163, wherein the specification includes a Non-Volatile Memory Express (NVMe) specification.

Statement 165. An embodiment of the disclosure includes the method according to statement 151, wherein the first field includes a bit 10 of a double word 0.

Statement 166. An embodiment of the disclosure includes a method, comprising:

receiving a notice at a storage device from a processor that a data structure is stored in a queue in a memory, the data structure including a first field storing a first value and a second field storing a second value;

retrieving the data structure from the queue by the storage device; and determining a third value for the second field, wherein the first value identifies that the second value is independent of the second field.

Statement 167. An embodiment of the disclosure includes the method according to statement 166, wherein the queue includes a submission queue or a completion queue.

Statement 168. An embodiment of the disclosure includes the method according to statement 166, further comprising executing a command on the storage device based at least in part on the data structure and the third value.

Statement 169. An embodiment of the disclosure includes the method according to statement 168, further comprising updating a queue head pointer for the queue in the memory.

Statement 170. An embodiment of the disclosure includes the method according to statement 166, wherein determining the third value for the second field includes determining the third value for the second field based at least in part on the first value.

Statement 171. An embodiment of the disclosure includes the method according to statement 166, wherein determining the third value for the second field includes determining the third value for the second field based at least in part on a rule.

Statement 172. An embodiment of the disclosure includes the method according to statement 171, further comprising receiving the rule at the storage device from the processor.

Statement 173. An embodiment of the disclosure includes the method according to statement 171, wherein the rule specifies that the third value is fixed.

Statement 174. An embodiment of the disclosure includes the method according to statement 171, wherein the rule includes a formula for calculating the third value.

Statement 175. An embodiment of the disclosure includes the method according to statement 174, wherein:

the data structure further includes a third field storing a fourth value; and determining the third value for the second field based at least in part on the rule includes determining the third value for the second field based at least in part on the formula and the fourth value.

Statement 176. An embodiment of the disclosure includes the method according to statement 171, wherein the rule identifies an external location for the third value.

Statement 177. An embodiment of the disclosure includes the method according to statement 176, wherein the second location includes a memory address in the memory, a register, or a log page.

Statement 178. An embodiment of the disclosure includes the method according to statement 166, wherein the first value includes an opcode.

Statement 179. An embodiment of the disclosure includes the method according to statement 178, further comprising defining the opcode as a variant of a second opcode.

Statement 180. An embodiment of the disclosure includes the method according to statement 179, wherein the second opcode is defined according to a specification.

Statement 181. An embodiment of the disclosure includes the method according to statement 180, wherein the specification includes a Non-Volatile Memory Express (NVMe) specification.

Statement 182. An embodiment of the disclosure includes the method according to statement 166, wherein the first field includes a bit 10 of a double word 0.

Statement 183. An embodiment of the disclosure includes an article, comprising a non-transitory storage medium, the non-transitory storage medium having stored thereon instructions that, when executed by a machine, result in:

establishing a data structure by a processor, the data structure including a first field storing a first value and a second field storing a second value; and storing the data structure in a queue in a memory by the processor;

wherein the first value identifies that the second value is independent of the second field.

Statement 184. An embodiment of the disclosure includes the article according to statement 183, wherein the queue includes a submission queue or a completion queue.

Statement 185. An embodiment of the disclosure includes the article according to statement 183, the non-transitory storage medium having stored thereon further instructions that, when executed by the machine, result in updating a queue tail pointer for the queue in a storage controller of the storage device.

Statement 186. An embodiment of the disclosure includes the article according to statement 183, the non-transitory storage medium having stored thereon further instructions that, when executed by the machine, result in specifying, by the processor, a rule for determining a third value for the second field.

Statement 187. An embodiment of the disclosure includes the article according to statement 186, wherein:

the non-transitory storage medium has stored thereon further instructions that, when executed by the machine, result in informing a storage device of the rule for determining the third value for the second field; and the storage device is configured to calculate the third value for the second field based at least in part on the rule.

Statement 188. An embodiment of the disclosure includes the article according to statement 186, wherein the rule specifies that the third value is fixed.

Statement 189. An embodiment of the disclosure includes the article according to statement 186, wherein the rule includes a formula for calculating the third value.

Statement 190. An embodiment of the disclosure includes the article according to statement 189, wherein:

the data structure includes a third field storing a fourth value; and the formula calculates the third value based at least in part on the fourth value.

Statement 191. An embodiment of the disclosure includes the article according to statement 186, wherein the rule identifies an external location for the third value.

Statement 192. An embodiment of the disclosure includes the article according to statement 191, wherein the second location includes a memory address in the memory, a register, or a log page.

Statement 193. An embodiment of the disclosure includes the article according to statement 183, wherein the first value includes an opcode.

Statement 194. An embodiment of the disclosure includes the article according to statement 193, the non-transitory storage medium having stored thereon further instructions that, when executed by the machine, result in defining the opcode as a variant of a second opcode.

Statement 195. An embodiment of the disclosure includes the article according to statement 194, wherein the second opcode is defined according to a specification.

Statement 196. An embodiment of the disclosure includes the article according to statement 195, wherein the specification includes a Non-Volatile Memory Express (NVMe) specification.

Statement 197. An embodiment of the disclosure includes the article according to statement 183, wherein the first field includes a bit 10 of a double word 0.

Statement 198. An embodiment of the disclosure includes an article, comprising a non-transitory storage medium, the non-transitory storage medium having stored thereon instructions that, when executed by a machine, result in:

receiving a notice at a storage device from a processor that a data structure is stored in a queue in a memory, the data structure including a first field storing a first value and a second field storing a second value;

retrieving the data structure from the queue by the storage device; and determining a third value for the second field, wherein the first value identifies that the second value is independent of the second field.

Statement 199. An embodiment of the disclosure includes the article according to statement 198, wherein the queue includes a submission queue or a completion queue.

Statement 200. An embodiment of the disclosure includes the article according to statement 198, the non-transitory storage medium having stored thereon further instructions that, when executed by the machine, result in executing a command on the storage device based at least in part on the data structure and the third value.

Statement 201. An embodiment of the disclosure includes the article according to statement 200, the non-transitory storage medium having stored thereon further instructions that, when executed by the machine, result in updating a queue head pointer for the queue in the memory.

Statement 202. An embodiment of the disclosure includes the article according to statement 198, wherein determining the third value for the second field includes determining the third value for the second field based at least in part on the first value.

Statement 203. An embodiment of the disclosure includes the article according to statement 198, wherein determining the third value for the second field includes determining the third value for the second field based at least in part on a rule.

Statement 204. An embodiment of the disclosure includes the article according to statement 203, the non-transitory storage medium having stored thereon further instructions that, when executed by the machine, result in receiving the rule at the storage device from the processor.

Statement 205. An embodiment of the disclosure includes the article according to statement 203, wherein the rule specifies that the third value is fixed.

Statement 206. An embodiment of the disclosure includes the article according to statement 203, wherein the rule includes a formula for calculating the third value.

Statement 207. An embodiment of the disclosure includes the article according to statement 206, wherein:

the data structure further includes a third field storing a fourth value; and determining the third value for the second field based at least in part on the rule includes determining the third value for the second field based at least in part on the formula and the fourth value.

Statement 208. An embodiment of the disclosure includes the article according to statement 203, wherein the rule identifies an external location for the third value.

Statement 209. An embodiment of the disclosure includes the article according to statement 208, wherein the second location includes a memory address in the memory, a register, or a log page.

Statement 210. An embodiment of the disclosure includes the article according to statement 198, wherein the first value includes an opcode.

Statement 211. An embodiment of the disclosure includes the article according to statement 210, the non-transitory storage medium having stored thereon further instructions that, when executed by the machine, result in defining the opcode as a variant of a second opcode.

Statement 212. An embodiment of the disclosure includes the article according to statement 211, wherein the second opcode is defined according to a specification.

Statement 213. An embodiment of the disclosure includes the article according to statement 212, wherein the specification includes a Non-Volatile Memory Express (NVMe) specification.

Statement 214. An embodiment of the disclosure includes the article according to statement 198, wherein the first field includes a bit 10 of a double word 0.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory, comprising:
a first data structure stored in the memory, the first data structure including a first field to store a first data relating to a command;
a second data structure stored in the memory, the second data structure including a second field to store a second data relating to the command;
a first queue stored in the memory, the first queue including the first data structure, the first queue including a first relative ordering of the first data structure and a third data structure storing a third data relating to a second command; and
a second queue stored in the memory, the second queue including the second data structure, the second queue including a second relative ordering of the second data structure and a fourth data structure storing a fourth data relating to the second command,
wherein the first queue is a first submission queue and the second queue is a second submission queue, or the first queue is a first completion queue and the second queue is a second completion queue
wherein the second relative ordering parallels the first relative ordering, and
wherein a controller is configured to process the command based at least in part on the first data relating to the command and the second data relating to the command.

2. The memory according to claim 1, wherein:
the first queue includes a number of entries; and
the second queue includes the number of entries.

3. The memory according to claim 2, wherein:
the first data structure is located at a position in the first queue; and
the second data structure is located at a same position in the second queue.

4. The memory according to claim 1, wherein:
the first queue includes a first number of entries; and
the second queue includes a second number of entries,
wherein the second number of entries is less than the first number of entries.

5. The memory according to claim 4, wherein the first data structure includes a third field to store an identifier of the second data structure.

6. The memory according to claim 4, wherein the second data structure includes a phase value.

7. A method, comprising:
establishing a first data structure by a processor, the first data structure including a first field storing a first data relating to a command;

establishing a second data structure by the processor, the second data structure including a second field storing a second data related to the command;
storing the first data structure in a first queue in a memory by the processor, the first queue including a first relative ordering of the first data structure and a third data structure storing a third data relating to a second command; and
storing the second data structure in a second queue in the memory by the processor, the second queue including a second relative ordering of the second data structure and a fourth data structure storing a fourth data relating to the second command,
wherein the first queue is a first submission queue and the second queue is a second submission queue, or the first queue is a first completion queue and the second queue is a second completion queue, and
wherein the second relative ordering parallels the first relative ordering.

8. The method according to claim 7, wherein establishing the first data structure by the processor includes storing a value in a third field in the first data structure to indicate the presence of the second data structure in the memory.

9. The method according to claim 7, wherein:
establishing the first data structure by the processor includes storing an operation code (opcode) or a command identifier in a third field in the first data structure; and
establishing the second data structure by the processor includes storing the opcode or the command identifier in a fourth field in the second data structure.

10. The method according to claim 7, wherein:
the first queue includes a number of entries; and
the second queue includes the number of entries.

11. The method according to claim 10, wherein:
the first data structure is located at a position in the first queue; and
the second data structure is located at a same position in the second queue.

12. The method according to claim 7, wherein:
the first queue includes a first number of entries; and
the second queue includes a second number of entries,
wherein the second number of entries is less than the first number of entries.

13. The method according to claim 12, wherein establishing a first data structure by a processor includes storing an identifier of the second data structure in a third field in the first data structure.

14. The method according to claim 12, wherein the second data structure includes a phase value.

15. The method according to claim 7, wherein:
the method further comprises:
requesting a format for the second data structure from a storage device by the processor; and
receiving the format for the second data structure from the storage device by the processor; and
establishing the second data structure by the processor includes establishing the second data structure by the processor based at least in part on the format for the second data structure received from the storage device by the processor.

* * * * *